US007453800B2

United States Patent
Takajitsuko et al.

(10) Patent No.: US 7,453,800 B2
(45) Date of Patent: Nov. 18, 2008

(54) COMMUNICATIONS APPARATUS AND CONGESTION CONTROL METHOD

(75) Inventors: Ryo Takajitsuko, Kawasaki (JP); Kenichi Okabe, Kawasaki (JP); Shiro Uriu, Kawasaki (JP); Hiroya Kawasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 627 days.

(21) Appl. No.: 10/020,077

(22) Filed: Oct. 30, 2001

(65) Prior Publication Data
US 2003/0002517 A1  Jan. 2, 2003

(30) Foreign Application Priority Data
Jun. 28, 2001 (JP) ............... 2001-196778

(51) Int. Cl.
*H04L 12/56* (2006.01)
(52) U.S. Cl. .............. 370/230; 370/235; 370/413
(58) Field of Classification Search ......... 370/412–414, 370/401, 419, 229, 230.1, 235
See application file for complete search history.

(56) References Cited

U.S. PATENT DOCUMENTS

| | | | | |
|---|---|---|---|---|
| 5,159,591 A | * | 10/1992 | Gohara et al. ............ 370/396 |
| 5,274,633 A | * | 12/1993 | Kato et al. ............... 370/219 |
| 5,392,280 A | * | 2/1995 | Zheng .................... 370/353 |
| 5,406,548 A | * | 4/1995 | Itoh et al. ................ 370/221 |
| 5,493,566 A | * | 2/1996 | Ljungberg et al. ........ 370/231 |
| 5,704,047 A | * | 12/1997 | Schneeberger ........... 709/235 |
| 5,726,987 A | * | 3/1998 | Uriu et al. .............. 370/395.72 |
| 5,732,069 A | * | 3/1998 | Nagino et al. ............ 370/219 |
| 5,737,338 A | * | 4/1998 | Eguchi et al. ............ 714/716 |
| 5,748,629 A | * | 5/1998 | Caldara et al. ........... 370/389 |
| 5,774,453 A |   | 6/1998 | Fukano et al. |
| 5,790,770 A | * | 8/1998 | McClure et al. .......... 709/231 |
| 5,978,359 A | * | 11/1999 | Caldara et al. ........... 370/236 |
| 5,991,266 A | * | 11/1999 | Zheng .................... 370/229 |
| 6,092,115 A | * | 7/2000 | Choudhury et al. ....... 709/235 |
| 6,119,173 A | * | 9/2000 | Pullen et al. ............. 719/328 |
| 6,301,253 B1 | * | 10/2001 | Ichikawa ............... 370/395.71 |
| 6,341,313 B1 | * | 1/2002 | Kanoh .................... 709/227 |
| 6,366,558 B1 | * | 4/2002 | Howes et al. ............ 370/219 |
| 6,421,741 B1 | * | 7/2002 | Minyard ................. 713/375 |
| 6,442,172 B1 | * | 8/2002 | Wallner et al. ........... 370/416 |
| 6,487,169 B1 | * | 11/2002 | Tada ...................... 370/219 |

(Continued)

FOREIGN PATENT DOCUMENTS

JP  8-288953  11/1996

(Continued)

OTHER PUBLICATIONS

Japanese Office Action dated Feb. 14, 2006 with translation.

*Primary Examiner*—Edan Orgad
*Assistant Examiner*—Salman Ahmed
(74) *Attorney, Agent, or Firm*—Katten Muchin Rosenman LLP

(57) ABSTRACT

A communications apparatus for switching among different interfaces includes a switch unit. The switch unit includes a main switch for switching data of a fixed length and an interface having a first buffer for an input of the main switch and a second buffer for an output of the main switch.

25 Claims, 19 Drawing Sheets

U.S. PATENT DOCUMENTS

| | | | | |
|---|---|---|---|---|
| 6,836,479 | B1* | 12/2004 | Sakamoto et al. | 370/389 |
| 6,898,189 | B1* | 5/2005 | Di Benedetto et al. | 370/256 |
| 6,907,001 | B1* | 6/2005 | Nakayama et al. | 370/230 |
| 6,914,879 | B1* | 7/2005 | Kleine-Altekamp et al. | 370/219 |
| 6,947,413 | B2* | 9/2005 | Wakabayashi et al. | 370/358 |
| 6,968,242 | B1* | 11/2005 | Hwu et al. | 700/82 |
| 6,992,980 | B2* | 1/2006 | Brezzo et al. | 370/229 |
| 7,020,133 | B2* | 3/2006 | Zhao et al. | 370/371 |
| 7,088,722 | B1* | 8/2006 | Hann | 370/395.2 |
| 7,137,122 | B2* | 11/2006 | Gilbert | 719/314 |
| 7,200,107 | B2* | 4/2007 | Kloth | 370/220 |
| 2002/0021661 | A1* | 2/2002 | DeGrandpre et al. | 370/219 |
| 2002/0065865 | A1* | 5/2002 | Gilbert | 709/102 |
| 2002/0085578 | A1* | 7/2002 | Dell et al. | 370/422 |
| 2002/0107908 | A1* | 8/2002 | Dharanikota | 709/203 |
| 2002/0154648 | A1* | 10/2002 | Araya et al. | 370/412 |
| 2002/0159460 | A1* | 10/2002 | Carrafiello et al. | 370/392 |
| 2003/0021230 | A1* | 1/2003 | Kuo et al. | 370/230 |
| 2003/0123455 | A1* | 7/2003 | Zhao et al. | 370/398 |
| 2003/0128703 | A1* | 7/2003 | Zhao et al. | 370/392 |
| 2003/0179712 | A1* | 9/2003 | Kobayashi et al. | 370/249 |
| 2004/0004961 | A1* | 1/2004 | Lakshmanamurthy et al. | 370/364 |
| 2004/0120335 | A1* | 6/2004 | Friesen et al. | 370/412 |
| 2005/0259578 | A1* | 11/2005 | Shinagawa et al. | 370/230 |
| 2005/0265346 | A1* | 12/2005 | Ho et al. | 370/392 |
| 2007/0047535 | A1* | 3/2007 | Varma | 370/360 |

FOREIGN PATENT DOCUMENTS

| | | |
|---|---|---|
| JP | 10065678 | 3/1998 |

* cited by examiner

→ DATA FLOW
⟵----- BACK PRESSURE FLOW
× DISPOSAL POINT

→ DATA FLOW
←---- BACK PRESSURE FLOW
× DISPOSAL POINT

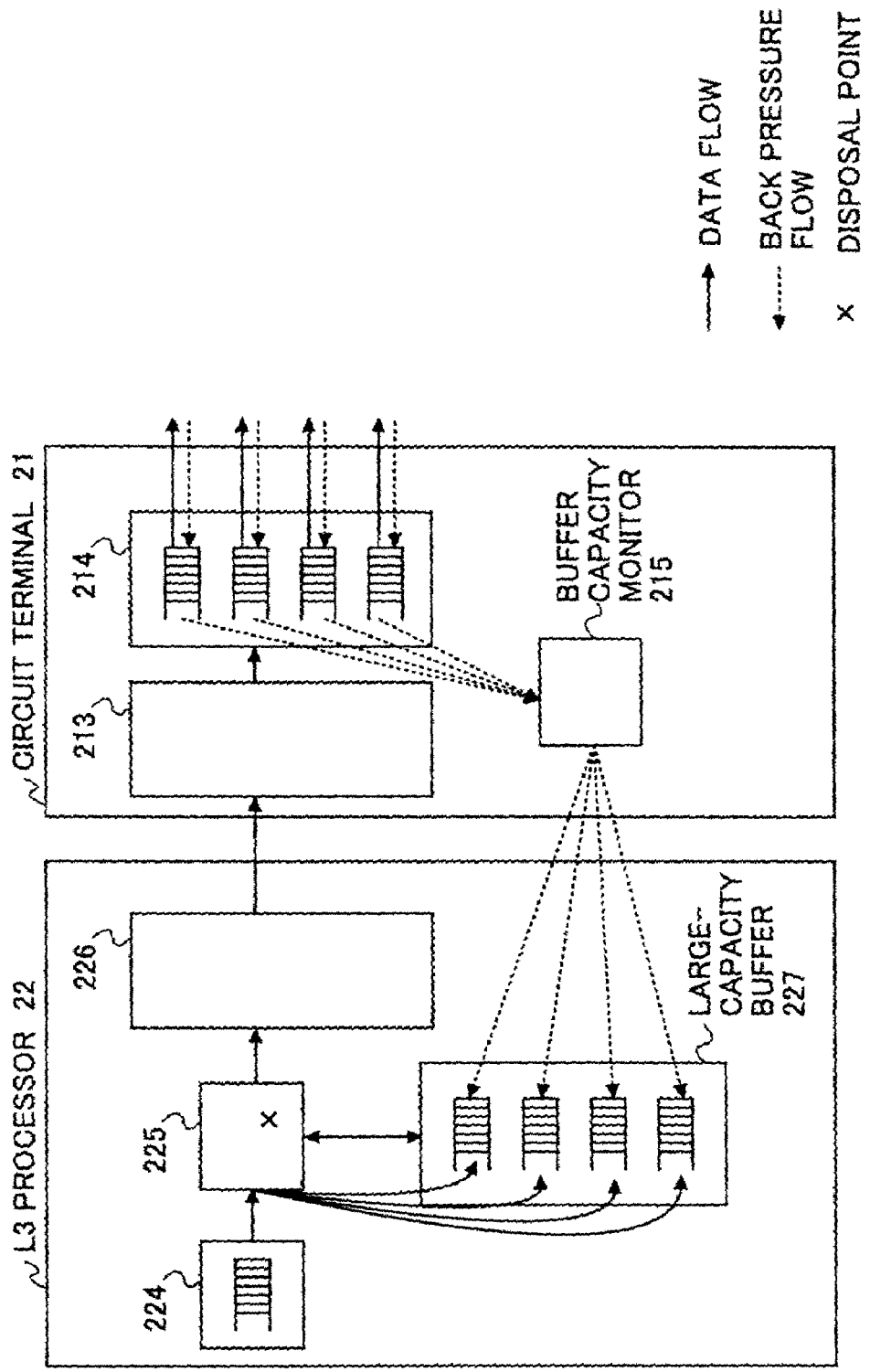

COMMUNICATIONS APPARATUS AND CONGESTION CONTROL METHOD

BACKGROUND OF THE INVENTION

1. Field of the Invention

The present invention relates to a communications apparatus designed to be connected to a network, and more particularly, to a communications apparatus such as a router accommodating a plurality of different circuits and having a switching function. More particularly still, the present invention relates to a method for queuing inside a router, and to back pressure control and related technique that is one type of traffic control.

2. Description of Related Art

Conventionally, a relay apparatus called a router is used to connect a plurality of networks and to route and relay data. The router converts the network protocol and address and establishes a data relay path.

FIG. 1 shows an example of a conventional network composition. Routers 10-13 connect different networks. For example, the router 10 connects the Sonet/SDH ADM (Sonet/Synchronous Digital Hierarchy Add-Drop Multiplexer) 14, ATM (Asynchronous Transfer Mode) dedicated line service network 15, OC-48DWDM (Dense Wavelength Division Multiplexing) network 16, and OC 48cDWDM network 17. In other words, the router 10 accommodates circuits of different transmission speeds (in other words, different interfaces). Similarly, the other routers 11-13 also connect different networks to each other and relay data.

This type of router relays packets of different sizes (lengths). That is, the packets it handles are of variable length. Additionally, when one circuit is congested, the router performs back pressure control to prevent the influx of packets to that circuit and thus prevent packet loss on an ethernet port unit basis (in other words, a circuit unit basis). For example, in case one port is congested, the router performs back pressure control on the circuit connected to that port. For example, in a case in which the router is equipped with a buffer for every port, the router restricts the influx of packets to the congested buffer.

However, one drawback of the conventional router is that it cannot accommodate different networks efficiently and relay data efficiently. More specifically, the conventional router has the following drawbacks.

First, internal control becomes extremely complicated when the conventional router attempts to relay different networks in order to relay variable length packets, and it is extremely difficult to perform QoS (Quality of Service) control for all the different transmission speeds involved. In this case, back pressure control is exerted on an ethernet port unit basis, which means that efficient back pressure control is not always exerted over packet processing at different transmission speeds such as ATM (Asynchronous Transfer Mode) and POS (Packet Over Switch). Accordingly, the conventional router cannot perform QoS control effectively and efficiently for different transmission speeds.

Second, because the conventional router has a buffer for every output port, the buffer cannot be used efficiently. For example, in a case in which one output port is congested and another output port is not, the overall router buffer utilization efficiency is low. In order to solve this problem it is possible to aggregate the output circuits (ports) and provide a single common buffer. However, when the router receives a request for back pressure control of a given output circuit, the router continues to be influenced by the backlog until data is received to the effect that the output circuit is not congested, creating a blocking situation in which data cannot be output.

Third, for purposes of reliability and conservative operation, the typical router is a multiplex router. In such a multiplexed router, when configured so as to commence control under backlog from either a working system or a passive system, there is a possibility that, depending on the latency and router state, the working system and passive system may fail. Accordingly, when switching from the working system to the passive system, depending on the back pressure controlled state and the buffering state, there is the possibility that a doubling up or a skipping of data may occur. Additionally, when a failure has occurred in the passive system and a backlog occurs, the working system is affected despite the breakdown in the passive system.

Fourth, ATM circuits have standards for data jitter and delay. In order to uphold those standards, ideally back pressure control would not be undertaken at all. However, in terms of effective utilization of the buffer, performing back pressure control is desirable. However, whenever back pressure control must be performed frequently it is impossible to satisfy data jitter and delay standards.

BRIEF SUMMARY OF THE INVENTION

Accordingly, the present invention discloses, and has as its object to provide, a communications apparatus and communications control method that address the drawbacks of the prior art, accommodating different networks efficiently and capable of relaying data efficiently.

The above-described object of the present invention is achieved by a communications apparatus designed to switch among different interfaces and comprising a switch unit, the switch unit comprising:

a main switch for switching data of a fixed length; and an interface having a first buffer for an input of the main switch and a second buffer for an output of the main switch.

According to this aspect of the invention, the main switch can be made bufferless. Accordingly, differences in transmission speed depending on network protocol can be absorbed and jitter due to switching can be reduced. Additionally, QoS control and back pressure control can be performed effectively and efficiently for all transmission speeds.

Additionally, the above-described object of the present invention is also achieved by a communications apparatus for switching among different interfaces and comprising a switch unit, the switch unit comprising:

a main switch for switching data of a fixed length; and an interface having a first buffer for an input of the main switch and a second buffer for an output of the main switch;

a plurality of first buffers and a plurality of second buffers being provided on each circuit.

Additionally, the above-described object of the present invention is also achieved by a communications control method for switching among different interfaces, comprising the steps of:

switching data handled by the different interfaces after once buffering data of a fixed length related to the data handled by the different interfaces, and sending the switched data to the circuits after once buffering the switched data.

BRIEF DESCRIPTION OF THE DRAWINGS

These and other objects, features, aspects and advantages of the present invention will become better understood and more apparent from the following description, appended claims and accompanying drawings, in which:

FIG. 16 is a diagram illustrating a second problem, in which

FIGS. 17A and 17B are diagrams showing a communications apparatus according to a second embodiment of the present invention, in which FIG. 17A illustrates a physical back pressure flow and FIG. 17B illustrates a logical back pressure flow.

FIG. 19 is a diagram showing a communications apparatus according to a fourth embodiment of the present invention.

DETAILED DESCRIPTION OF THE INVENTION

A description will now be given of embodiments of the present invention, with reference to the accompanying drawings. It should be noted that identical or corresponding elements in the embodiments are given identical or corresponding reference numbers in all drawings, with detailed descriptions of such elements given once and thereafter omitted.

Figure 2:
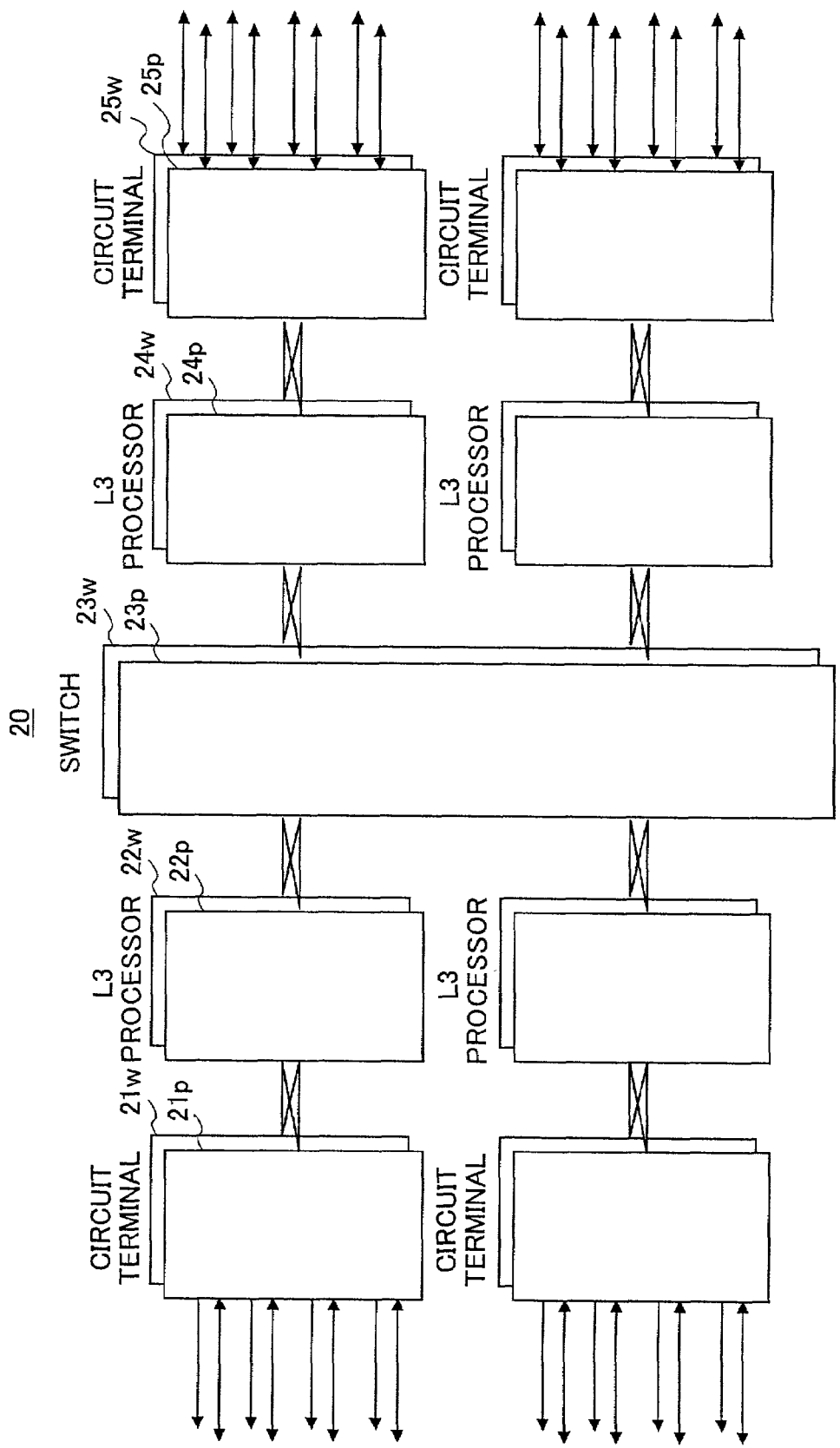
FIG. 2 is a block diagram of a composition of a router according to a first embodiment of the present invention.

FIG. 2 is a block diagram of a composition of a router according to a first embodiment of the present invention.

Figure 1:
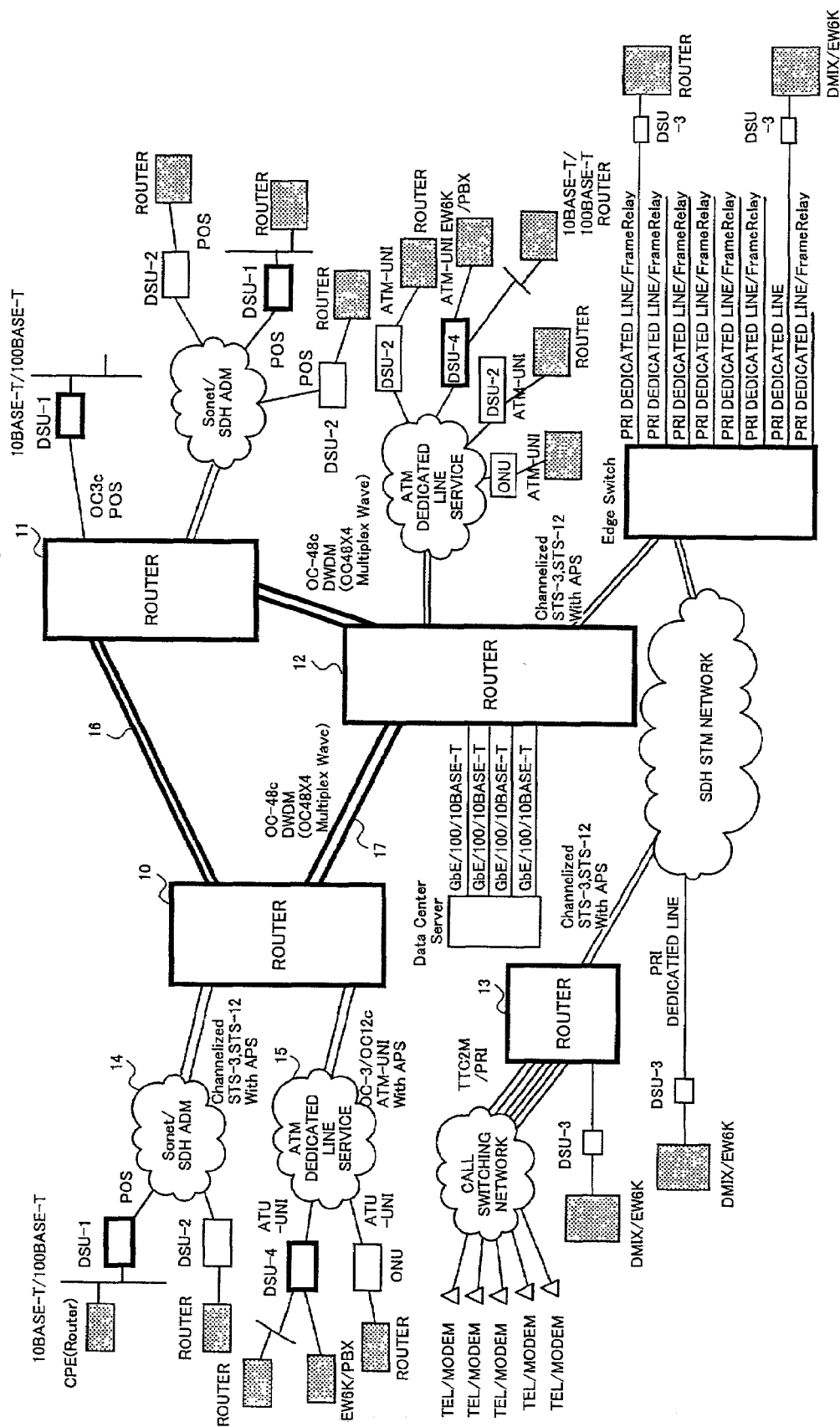
FIG. 1 shows an example of a conventional network composition.

As shown in the diagram, a router 20 replaces the routers 10-13 shown in FIG. 1. The router 20 is multiplexed.

The router 20 comprises circuit terminals 21w, 21p, L3 (layer 3: network layer) processors 22w and 22p, switches 23w and 23p, L3 processors 24w and 24p, and circuit terminals 25w and 25p. The suffix "w" indicates a multiplexed working system and the suffix "p" indicates a passive system. The multiplexed L3 processor and circuit terminal that are connected to the switches 23w, 23p need not necessarily be multiplexed.

The types of circuits handled by the router 20 include Ether 10/100 Base-T, Ether 1000 Base-T, POS, OC3C, OC12C, OC48C, ATM OC3C, OC12C, STM T1/E1, STS3, STS12, and so forth. The types of circuits handled are not limited to these specifically enumerated circuits, and it is contemplated that the router 20 may handle other equivalent circuits that have been or may be developed.

A description will now be given of the internal composition of the constituent units shown in FIG. 2.

Figure 3:
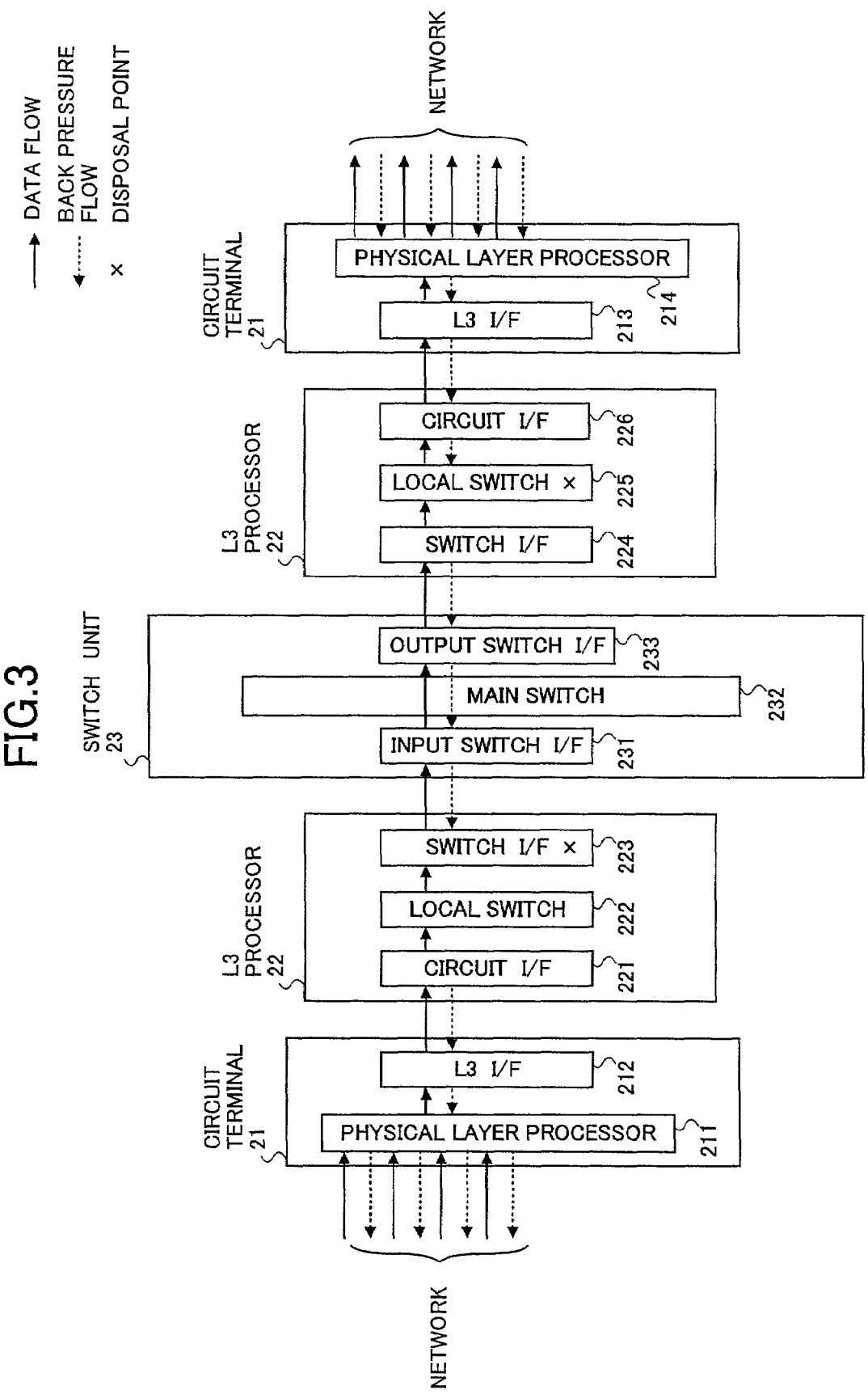
FIG. 3 is a block diagram illustrating one possible internal composition of the constituent units shown in FIG. 2.

FIG. 3 is a block diagram illustrating one possible internal composition of the constituent units shown in FIG. 2.

The composition shown in FIG. 3 may apply to either the passive system or the multiplexed working system. Thus, in FIG. 3, the suffixes "w" and "p" attached to the reference numbers that distinguish between the working system and the passive system have been eliminated. Additionally, the composition shown in FIG. 3 is arranged along the flow of data as shown by the solid arrows therein. Accordingly, the circuit terminal 21 and the L3 processor 22 are shown separated into an input side and an output side.

The input side circuit terminal 21 comprises a physical layer processor 211 and an L3 interface 212. The L3 processor 22 comprises a circuit interface 221, a local switch 222 and a switch interface 223. The L3 processor 22 transfers data between communications apparatus connected to a plurality of networks and performs processes data relay according to a communications protocol. The switch unit 23 comprises an input switch interface 231, a main switch 232 and an output switch interface 233. The output side L3 processor 22 comprises a switch interface 224, a local switch 225 and a circuit interface 226. The output side circuit terminal 25 comprises an L3 interface 213 and a physical layer processor 214.

The circuit terminal 21 physical layer processor 211 accommodates and aggregates circuits on a network connected via a port. The L3 interface 212 performs layer 2 processing (layer 2 terminal process) on data on the circuit aggregated by the physical layer processor 211. The L3 processor 22 circuit interface 221, after temporarily accumulating variable-length packets in a buffer, converts the packets so stored into fixed-length packets of a predetermined length (hereinafter referred to as cells). This process is called fragmenting. The local switch 222 carries out switching of the cells from the circuit interface 221. The switching interface 223, after temporarily storing the cells output by the local switch 222, outputs the cells to the switch 23. The switch 23, after temporarily storing the cells from the L3 processor 22, outputs the cells to the main switch 232. The main switch 232 performs routing based on layer 3 IP (Internet Protocol). The main switch 232 does not have a buffer.

Figure 4:
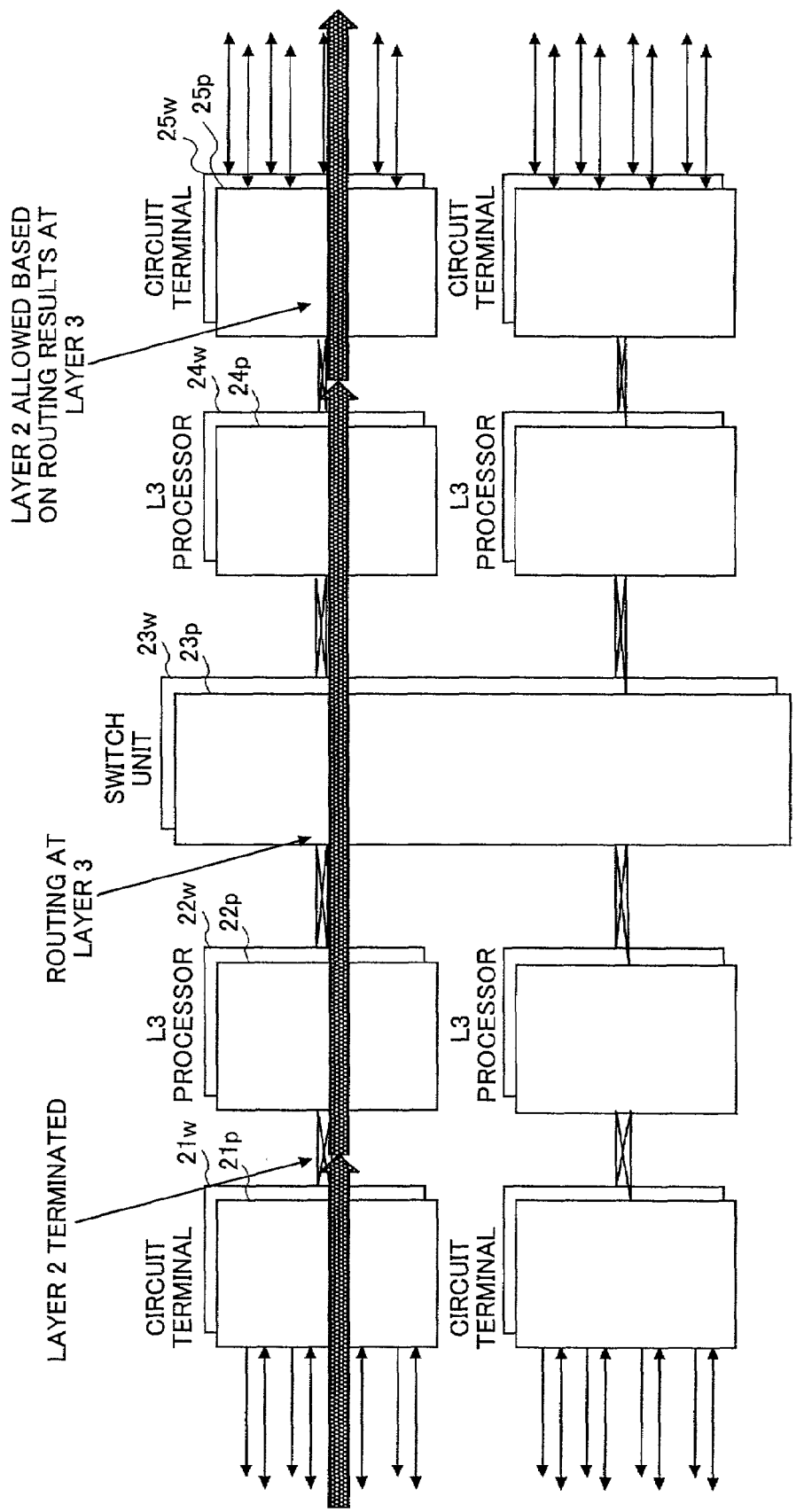
FIG. 4 is a diagram showing a layer 2 terminal process and a layer 3 routing process.

FIG. 4 is a diagram showing a layer 2 terminal process and a layer 3 routing process. For example, in an ATM circuit, the ATM layer is terminated at the circuit terminal 21, with the switch 23 routing the ATM cell based on the layer 3 IP data.

The switch interface 233 temporarily stores cells routed by the main switch 232.

The output side L3 processor 22 switch interface 224 temporarily stores cells from the switch 23. The local switch 225 switches cells from the circuit interface 224. The circuit interface 226 temporarily stores cells from the local switch 225. The circuit terminal 21 L3 interface 213 temporarily stores cells routed from the L3 processor 22, adds data relating to layer 2, and further, converts the cells to corresponding variable-length packets. The physical layer processor 214 outputs the variable-length packets to the corresponding circuit (port).

The symbol "x" in FIG. 3 indicates a back pressure signal disposal (terminal) point for the back pressure signal to be described in greater detail below. In a communications apparatus according to a first embodiment of the present invention, the back pressure signal is terminated at the switch interface 223 of the L3 processor 22 and data discarded. Additionally, in a communications apparatus according to a second embodiment of the present invention, the back pressure signal is terminated at the local switch 225 of the L3 processor 22, and data discarded.

A description will now be given of a basic composition and a basic operation of the L3 processor 22 and switch unit 23.

Figure 5:
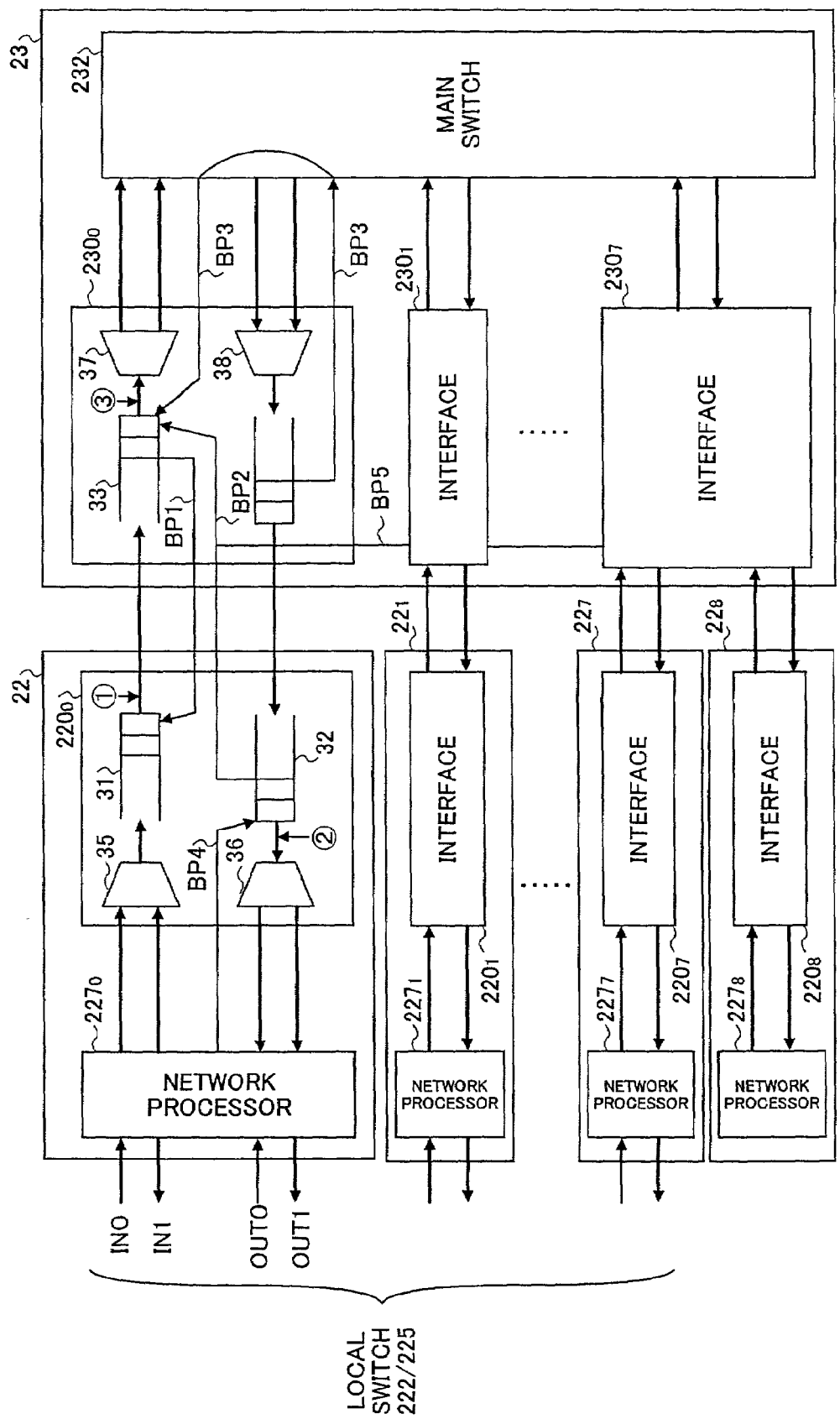
FIG. 5 is a block diagram showing a basic composition of L3 processor and switch unit.

FIG. 5 is a block diagram showing a basic composition of L3 processor and switch unit.

As shown in the diagram, the L3 processor 22 comprises circuit processors $22_0$-$22_7$ and internal processor $22_8$. The circuit processor $22_0$ comprises interface $220_0$ and network processor $227_0$. The interface $220_0$ corresponds to one port (circuit) of the router 20, and is equivalent to an internal circuit of the switch interfaces 223 and 224 of FIG. 3. The network processor $227_0$ is connected to the local switch 222 of FIG. 3, but in order to simplify the drawing has been eliminated from FIG. 3. The network processor $227_0$ processes the two input lines IN0, IN1 and the two output lines OUT0, OUT1. The interface $220_0$ is equipped with FIFO type common buffers 31, 32, input buffer 35 and output buffer 36. The other circuit processors $22_2$-$22_7$ have the same composition. That is, the circuit processors $22_2$$22_7$ have interfaces $220_1$-$220_7$ and network processors $227_1$-$227_7$, respectively.

The internal processor $22_8$ comprises interface $220_8$ and main processor $227_8$. The main processor $227_8$ provides comprehensive control of the router 20 and, via the interface $220_8$, exchanges cells with the switch unit 23.

The switch unit 23 comprises the main switch 232 shown in FIG. 3 and the circuit processors $230_0$-$230_7$. The interfaces $230_0$-$230_7$ are the equivalent of internal circuits of the switch interface 231, 233. The interfaces $230_0$-$230_7$ correspond to the L3 processor interfaces $220_0$-$220_7$, respectively. Additionally, the interface $220_8$ is connected to the interface $230_7$. The interface $230_0$, comprises FIFO-type common buffers 33 and 34, as well as output buffer 37 and input buffer 38.

The other interfaces $230_1$-$230_7$ have the same composition.

It should be noted that, for ease of explanation, the common buffer 33 and the output buffer 37 are together called the first buffer. Additionally, the common buffer 34 and the input buffer 38 are together called the second buffer. Further, the common buffer 35 and the input buffer 31 are together called the third buffer. Further, the common buffer 32 and the output buffer 36 are together called the fourth buffer.

A description will now be given of the basic operation of the circuit shown in FIG. 5.

The network processor $227_0$ receives cells from the local switch 222 and outputs to the input buffer 35. Cell input is accomplished with two lines, inputs IN0 and IN1. The input buffer 35 outputs the received cells to the common buffer 31. By so doing, a cell queue is formed at the common buffer 31. The cells in the common buffer 31 are then read out according to a scheduling process to be described in greater detail below, and sent to the switch unit 23.

The common buffer 33 of the switch unit 23 accommodates the cells sent from the interface $220_0$. The cells contained in the common buffer 33 are the read out according to a scheduling process to be described in greater detail later, and, after being stored temporarily in the output buffer 37, sent to the main switch 232. The main switch 232 switches the received cells.

The cells from the main switch 232, after being temporarily stored in the input buffer 38, are stored in the common buffer 34. The cells stored in the common buffer 34 are then read out according to a scheduling process to be described in greater detail below and sent to the interface $220_0$. The common buffer 32 of the interface $220_0$ accommodates the received cells. Then, the cells are read out from the common buffer 32 according to a scheduling process to be described in greater detail below and temporarily stored in the output buffer 36. Then, the cells read out from the output buffer 36 are output to the network processor $227_0$. The network processor $227_0$ outputs the received cells to the local switch 222 via the output lines OUT0 and OUT1.

As will be described in greater detail below, the individual input buffers 35, 38 and output buffers 36, 37 have a buffer (queue) for every QoS class. The QoS class may for example include fixed bit rate service, variable bit rate service, unrestricted bit rate service, available bit rate service and multicast service. The QoS service unit can be set arbitrarily for each interface.

A description will now be given of back pressure control.

FIG. 5 shows back pressure signals BP1, BP2, BP3, BP4 and BP5 used in the communications apparatus according to a first embodiment of the present invention. The back pressure signal BP1 is generated when the output buffer 37 and the common buffer 33 inside the interface $230_0$ of the switch unit 23 assumes a predetermined state. Such a predetermined state may be a state of congestion or a state in which congestion is predicted to occur. Congestion may also be defined to include a state in which congestion is predicted to occur.

The back pressure signal BP1 stops the readout of cells from the common buffer 31 provided inside the interface $220_0$ of the L3 processor 22. The arrow of back pressure signal BP1 in FIG. 5 indicates a logical flow. Preferably, the back pressure signal BP1 is composed of cells. These cells are called flow control cells. That is, in-band flow control transmits the back pressure signal BP1. More specifically, when the common buffer 33 or the output buffer 37 assume a predetermined state, the scheduling process sends the flow control cells to the common buffer 32 of the interface $220_0$ via the common buffer 34. When the flow control cells are read from the common buffer 32, the scheduling process stops the readout of cells from the common buffer 31.

The back pressure signal BP2 is generated when the output buffer 36 or the joint buffer 32 inside the interface $220_0$ of the L3 processor 22 assumes a predetermined state. The back pressure signal BP2 stops the readout of cells from the common buffer 33 provided inside the interface $230_0$ of the switch unit 23. The arrow of back pressure signal BP1 in FIG. 5 indicates a logical flow. Preferably, the back pressure signal BP1 is composed of flow control cells. The physical flow of the flow control cells is as follows: When the common buffer 32 or the output buffer 36 assumes a predetermined state, the scheduling process sends the flow control cells to the common buffer 33 of the interface $230_0$ via the common buffer 31. When flow control cells are read out from the common buffer 33, the scheduling process stops the readout of cells from the common buffer 33.

It should be noted that, as will be described in greater detail below, the back pressure signal BP2 exerts link level flow control, that is, can stop the readout of cells from the common buffer 33 for all the interfaces $230_0$-$230_7$. This control is carried out in conjunction with back pressure signal BP5 to be described in greater detail below.

The back pressure signal BP3 is generated when the input buffer 38 or the common buffer 24 inside the interface $230_0$ of the switch unit 23 assumes a predetermined state. The back pressure signal BP3 stops the readout of cells from the common buffer 33 provided inside the interface $230_0$ of the switch unit 23. The arrow of back pressure signal BP3 in FIG. 5 indicates a logical flow. Preferably, the back pressure signal BP3 is composed of flow control cells. More specifically, when the common buffer 34 or the input buffer 38 assume a predetermined state, the scheduling process sends the flow control cells to the common buffer 33 of the interface $220_0$ via the common buffer 31. When the flow control cells are read from the common buffer 33, the scheduling process stops the readout of cells from the common buffer 33.

The back pressure signal BP4 controls the readout of cells from the common buffer 32 in output OUT0, OUT1 units. When the internal buffer provided at the local switch 225 (see FIG. 3) at the end of the output OUT0 or OUT1 assumes a predetermined state, the network processor $227_0$ transmits the back pressure signal BP4 to the common buffer 32 via a dedicated line.

The back pressure signal BP5 is a signal transmitted serially via a back pressure bus to be described in greater detail below. The back pressure bus connects the interfaces $230_0$-$230_7$ to each other. The back pressure signal BP5 stops the readout of cells from the common buffer 33 inside the interface $230_0$-$230_7$. Readout using the back pressure signal BP5, as will be described in greater detail below, can be stopped at the QoS class unit (also called service class) as well as at the buffer unit.

A description will now be given of the scheduling process of the common buffer 31 provided inside the interface $230_0$-$230_7$, with reference in the first instance to FIG. 6.

Figure 6:
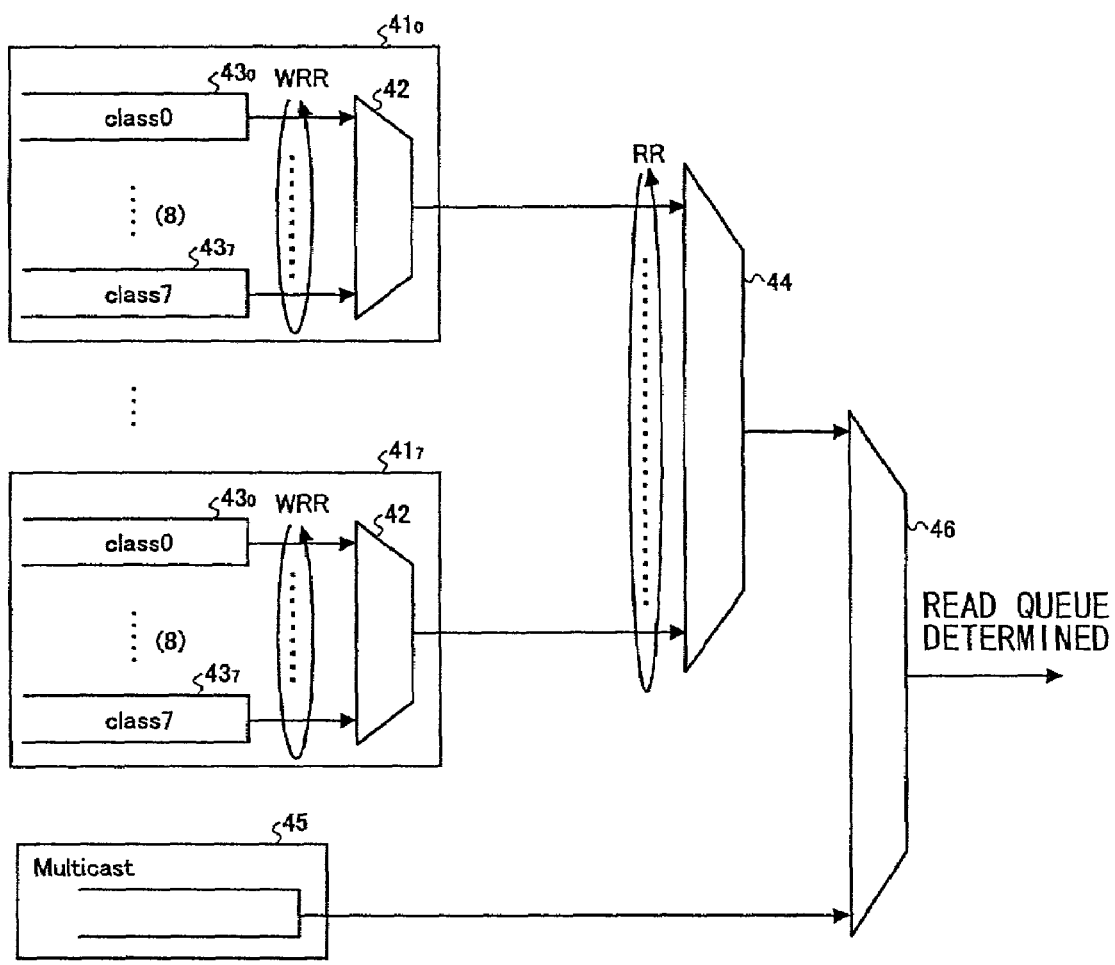
FIG. 6 is a diagram showing one possible composition of a first scheduler.

FIG. 6 is a diagram showing one possible composition of a first scheduler that performs the scheduling process (sometimes hereinafter referred to simply as scheduling).

The scheduler shown in FIG. 6 (hereinafter referred to as the first scheduler) comprises address queues $41_0$-$41_7$ corresponding to the common buffer 31 of the interface $220_0$-$220_7$, an address queue 45 that contains the addresses of cells to be multicast, a selector 44 that selects an output of the address queues $41_0$-$41_7$, and a selector 46 that selects either the output of the selector 44 or the output of the address queue 45. The first scheduler, which is absent from FIGS. 2-5 above simply for ease of explanation and illustration, controls the readout of that which is indicated as ① in FIG. 5.

Each of the address queues $41_0$-$41_7$ has queues $43_0$-$43_7$, respectively, of a number corresponding to the class. In this embodiment, eight classes are contemplated, ranging from class 0 to class 7. Address pointer values of cells stored in the corresponding common buffer 31 are stored in the queues $43_0$-$43_7$. For example, cells of class 0 are stored in queue $43_0$ address queue $41_0$. Each of the queues $43_0$-$43_7$ are composed of FIFO-type memory units. Address pointer values of the common buffer 31 in which queues to be multicast are stored are stored in the address queue 45.

The selector 42 selects (arbitrates) a queue to be read according to scheduling between classes. The selection logic of this scheduling is Weighted Round Robin (hereinafter sometimes referred to as WRR). In contrast to the simple sequential selection of ordinary Round Robin (RR) logic, with the WRR logic it is possible to weight queues in the round. This weighting establishes the maximum number of times readout on a continuous basis from that queue can be performed, so when all the queues are given a weighting of 1 the WRR logic and the RR logic are identical. After initialization, selection from the queue $43_0$ is performed. When the queue is empty or continuously read, the process moves to the next class readout at the next packet period. Different weightings can be given to different classes. For example, the weighting can be the same for interfaces $220_0$-$220_7$.

Accordingly, scheduling between classes is carried out for each of the address queues $41_0$-$41_7$.

The selector 44 schedules selection of address queues of cells to be read from among the address queues $41_0$-$41_7$. The selection logic may be Round Robin.

The selector 46 selects either the selector 44 output or the output of the multicast address queue 45. The selection logic only reads from the multicast when there is no output from the selector 44, in other words, only when there are no unicast cells to be read from the common buffers 31 of the address queues $41_0$-$41_7$. In this case, the multicast queue (buffer) inside the common buffer 31 becomes the object to be read. When there are not even cells to be read in the multicast queue as well, the selection logic does not read cells during cell time.

As described above, the first scheduler determines the address of the cell to be read from the interfaces $220_0$-$220_7$.

It should be noted that, in order to transmit the flow control cells that form the back pressure signal BP2, the first scheduler forcibly inserts a single non-effective cell so as to be able to create a time during which the readout of cells from the buffer does not occur.

A description will now be given of back pressure control using the back pressure signal BP1.

As described above, an arbitrary packet period read queue is determined using the three scheduling processes. When the back pressure signal BP1 is sent to the above-described scheduler, the first scheduler stops the readout of cells pursuant to the back pressure signal BP1. As will be explained below, there are two types of back pressure signal BP1.

When the back pressure signal BP1 is link level, that is, when the switch interface 23 requests that the switch interface 22 stop the readout of all cells, the first scheduler receives the back pressure signal BP1 shown in FIG. 5 and disables the selector 46 shown in FIG. 6. Accordingly, cell readout addresses are not supplied to the common buffer and the readout of cells from the interfaces $220_0$-$220_7$ is stopped.

By contrast, when the back pressure signal BP1 is port unit (circuit unit), there is, for example, a possibility that the common buffer 33 inside the interface $230_0$ of the switch unit 23 will be congested. Thus, when requesting a stop to the readout of cells from the common buffer 31, the first scheduler receives the back pressure signal BP1 shown in FIG. 5 and disables the selector 42 shown in FIG. 6. Accordingly, the readout of cells from the common buffer 31 of the interface $220_0$ is stopped.

The scheduling process of the common buffer 32 of the interfaces $220_0$-$220_7$ is performed by the second scheduler. The second scheduler controls the cell readout of that which is indicated by the reference numeral ② in FIG. 5.

Figure 7:
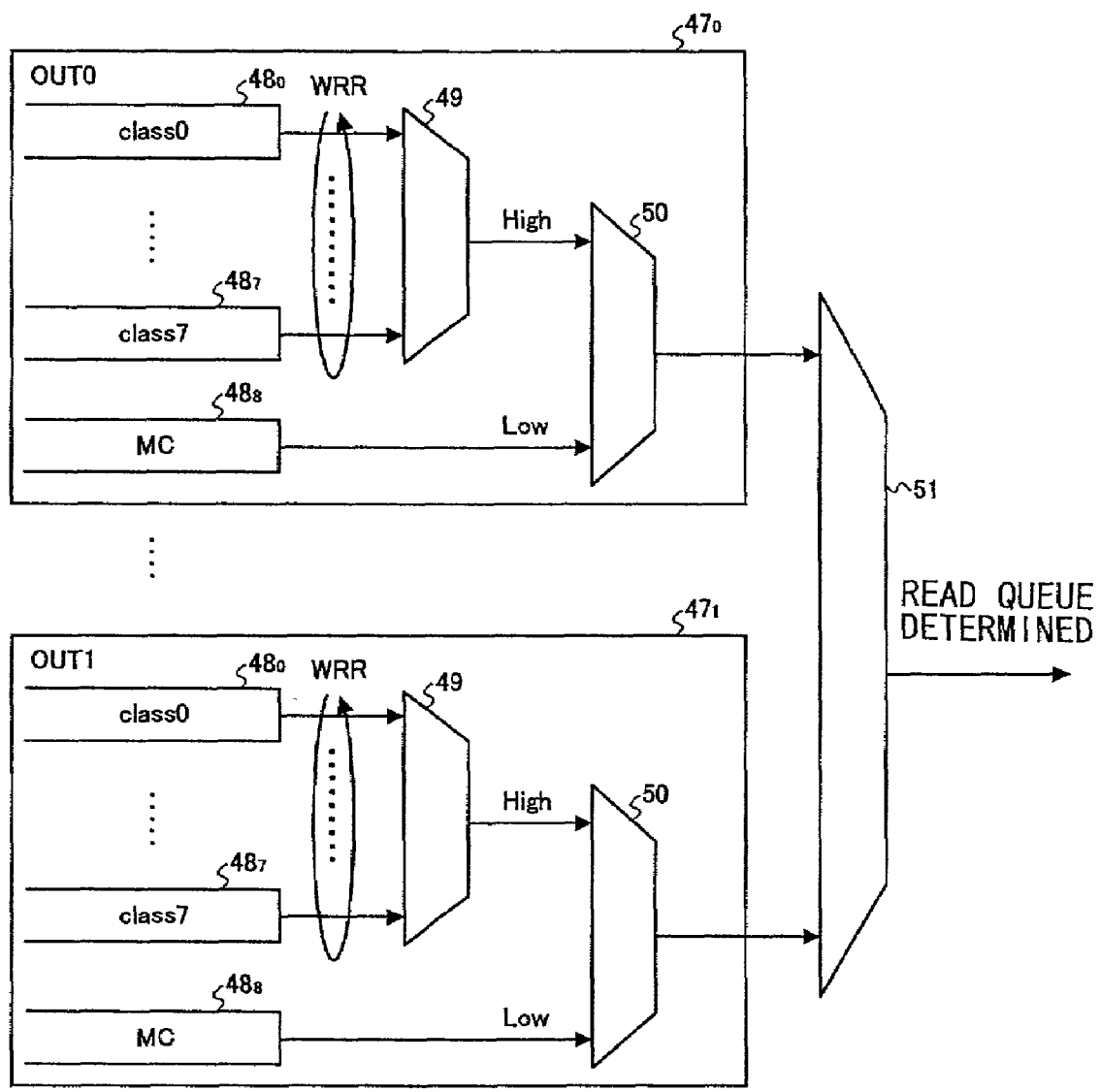
FIG. 7 is a diagram showing one possible composition of a second scheduler.

FIG. 7 is a diagram showing one possible composition of a second scheduler. The second scheduler comprises address queues $47_0$, $47_1$ that correspond to outputs OUT0 and OUT1, respectively, and a selector 51 that selects an output of either the address queue $47_0$ or the address queue $47_1$. The address queues $47_0$, $47_1$ each have queues $48_0$-$48_7$ corresponding to the eight classes, a queue $48_8$ corresponding to the multicast, a selector 49 that chooses one of the aforementioned queues, and a selector 50 that selects one or the other of either the selector 49 or the queue $48_8$.

The second scheduler determines the readout of which queue corresponding to which QoS class. In order to perform the above-described selection process there are two logic methods. The first logic involves arbitration between outputs OUT0, OUT1, the second logic involves arbitration between QoS classes.

The first logic determines for each packet period which packet to read, either OUT0 or OUT1. This selection involves reading OUT0 and OUT1 fixedly in turns at each packet period, and in order to do so a per-2-packet-period multiframe is generated, the first half for OUT0 and the second half for OUT1.

The second logic involves determining which queue to read from among the queues $48_0$-$48_7$ corresponding to the eight classes and the one multicast queue $48_8$ for each output OUT0, OUT1. As one example of selection logic, first, precedence is given to logic that guarantees frame continuity, and next, a Weighted Round Robin system for the eight QoS unicasts is employed, and then finally, a selection is made between unicast and multicast according to a fixed priority ranking. In a logic guaranteeing frame continuity, address pointer values are read out from corresponding queues so as to be able to read out the cells continuously from among the selected queues. All queues, when not in a frame read state, move to the next WRR system. This logic selection employing the WRR method is the same selection as described above with respect to the scheduling of the common buffer 31. However, because it is necessary to guarantee frame continuity, the weighting is not as to the number of continuous cell readouts but as to the maximum number of continuous frame readouts. The process carried out according to a fixed priority ranking reads out the address pointer values from the multicast queue $48_8$ when all class queues $48_0$-$48_7$ are empty. That is, the multicast frame is not read as long as a unicast frame exists. It should be noted that when all the queues $48_0$-$48_8$ are empty the readout is invalid.

A description will now be given of back pressure control using the back pressure signal BP4.

As stated above, the back pressure signal BP4 controls the readout of cells of the common buffer 31 in outputs OUT0, OUT1 units. When an internal buffer provided in the local switch 225 (see FIG. 3) at the end of the outputs OUT0, OUT1 assumes a predetermined state, the network processor $227_0$ sends the back pressure signal BP4 to the common buffer 32 via a dedicated line. When the second scheduler shown in FIG. 7 receives the back pressure signal BP4, the second scheduler masks an output of address queues $47_0$-$47_1$ corresponding to the output designated by the back pressure signal BP4. By masking, packets to be read are rendered nonexistent. That is, the output of the address queues $47_0$-$47_1$ is rendered invalid.

A description will now be given of the scheduling of the common buffer 33 provided inside the interfaces $230_0$-$230_7$, with reference in the first instance to FIG. 8 and FIG. 9.

Figure 8:
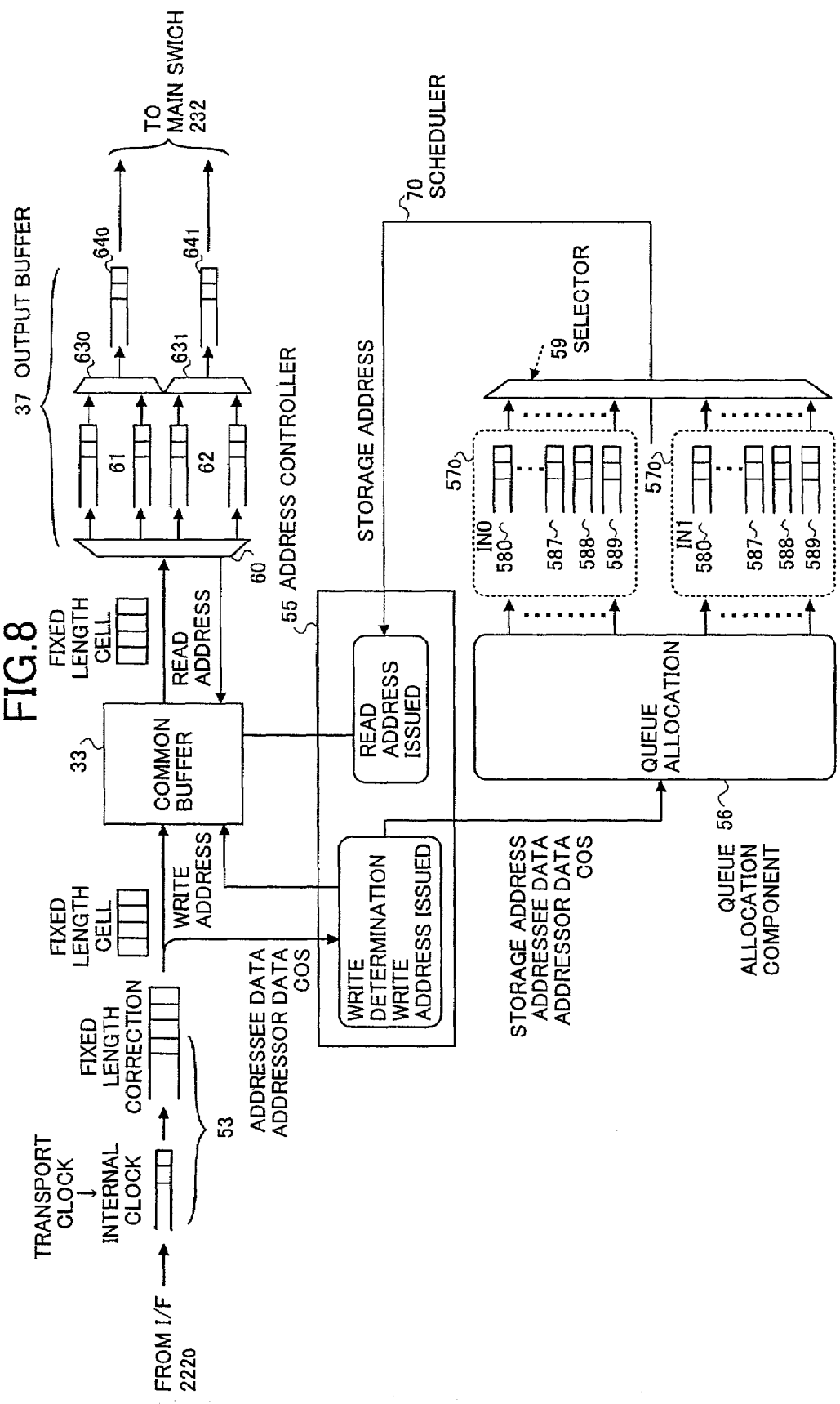
FIG. 8 is a diagram showing one possible composition of a common buffer and an output buffer of an interface.

FIG. 8 is a diagram showing one possible composition of a common buffer and an output buffer of an interface.

As shown in FIG. 8, the interface $230_0$ is configured so that the common buffer 33 comprises a preprocessor 53, a common buffer 33, an address controller 55 and a scheduler 70 (hereinafter referred to as the third scheduler). The third scheduler 70 comprises a queue allocation component 56, address queues $57_0$ and $57_1$, and a selector 59. As can be seen also in FIG. 9, the output buffer 37 comprises a cell distributor 66, FIFO-type buffers 61 and 62, selectors $63_0$ and $63_1$, and FIFO-type buffers $64_0$ and $64_1$. The third scheduler 70 controls the readout of cells from that which is indicated by reference symbol ③ in FIG. 5.

The preprocessor 53, after synchronizing to an internal clock the cells received from the circuit processor $22_0$ of the L3 processor 22, corrects the cells to a fixed length. The cells are then stored inside the common buffer 33 according to a storage address issued by the address controller 55. The storage address may be issued sequentially by an address controller 55 write address issue function. Addressee data and addresser data for each cell are output to the queue allocation component 56 via the address controller 55.

The queue allocation component 56 receives the addressee data, the addresser data, the QoS and the above-described storage address endowed to each cell from the address controller 55 and writes a write address, that is, an address pointer value, to the internal queue of the address queue $57_0$ or the address queue $57_1$.

The address queue $57_0$ corresponds to the input IN0, and internally, comprises queues $58_0$-$58_7$ corresponding to interfaces $230_0$-$230_7$, queue $58_8$ corresponding to interface $228_8$ of FIG. 5, and queue $58_9$ corresponding to the multicast. Similarly, the address queue $57_1$ corresponds to input IN1, and internally, comprises queues $58_0$-$58_7$ corresponding to interfaces $230_0$-$230_7$, queue 588 corresponding to interface $228_8$ of FIG. 5, and queue $58_9$ corresponding to the multicast. The selector 59 selects the output of the address queue $57_0$ or the address queue $57_1$.

Figure 9:
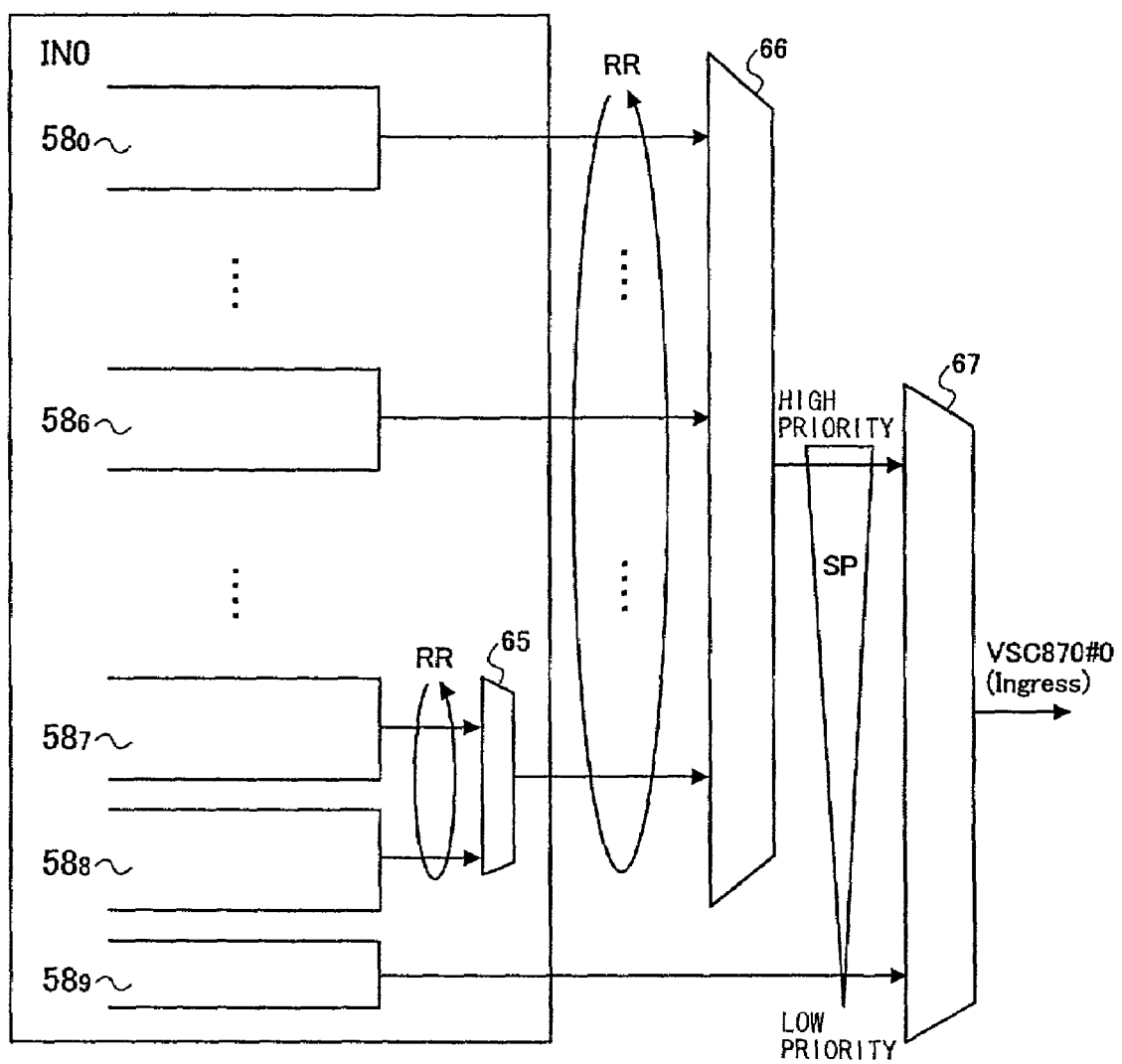
FIG. 9 is a diagram showing one possible composition of a third scheduler.

FIG. 9 is a diagram showing one possible composition of a third scheduler. The scheduler 70 performs scheduling both within inputs IN0, IN1 and between inputs IN0, IN1. The third scheduler 70 has selectors 65, 66 and 67 corresponding to input IN0, Though not shown in the diagrams, nevertheless the scheduler 70 has the same selectors for the input IN1 as well.

The selector 65 performs scheduling between the address queue $58_7$ and the address queue $58_8$. That is, this scheduling is performed prior to the scheduling for the address queues $58_0$ through $58_6$. This scheduling may be performed by the Round Robin method. The address pointer value selected by the selector 65 is scheduled together with address queues $58_0$ through $58_6$ together with selector 66. This scheduling may be carried out by the Round Robin method. The address pointer value selected by the selector 65 is then transmitted to the selector 67. The selector 67 then schedules the selector 65 output, that is, the unicast cells and the multicast cells designated by the address pointer values stored in the address queue $58_9$. This scheduling makes it possible to read from the multicast queue only when no unicast queue exists.

Finally, the output of the selector 67 for the address queues $57_0$ and $57_1$ is selected (for example alternately) by a selector not shown in the diagram but internal to the selector 59, and the selected address pointer value is output to the address controller 55. The address controller 55 read address issue function then issues a read address to the common buffer 33 based on the address value received from the scheduler 70.

The cells read out from the common buffer 33 are allotted to either the buffer 61 corresponding to the input IN0 or to the buffer 62 corresponding to the input IN1 by the queue allocation component 60 of the output buffer 37. The selector $63_0$ and the selector $63_1$, respectively, select cells read out from the FIFO-type buffers 61 and 62 and outputs the cells to the main switch 232 shown in FIG. 5.

A description will now be given of back pressure control using the back pressure signal BP5, with reference to FIG. 10.

Figure 10:
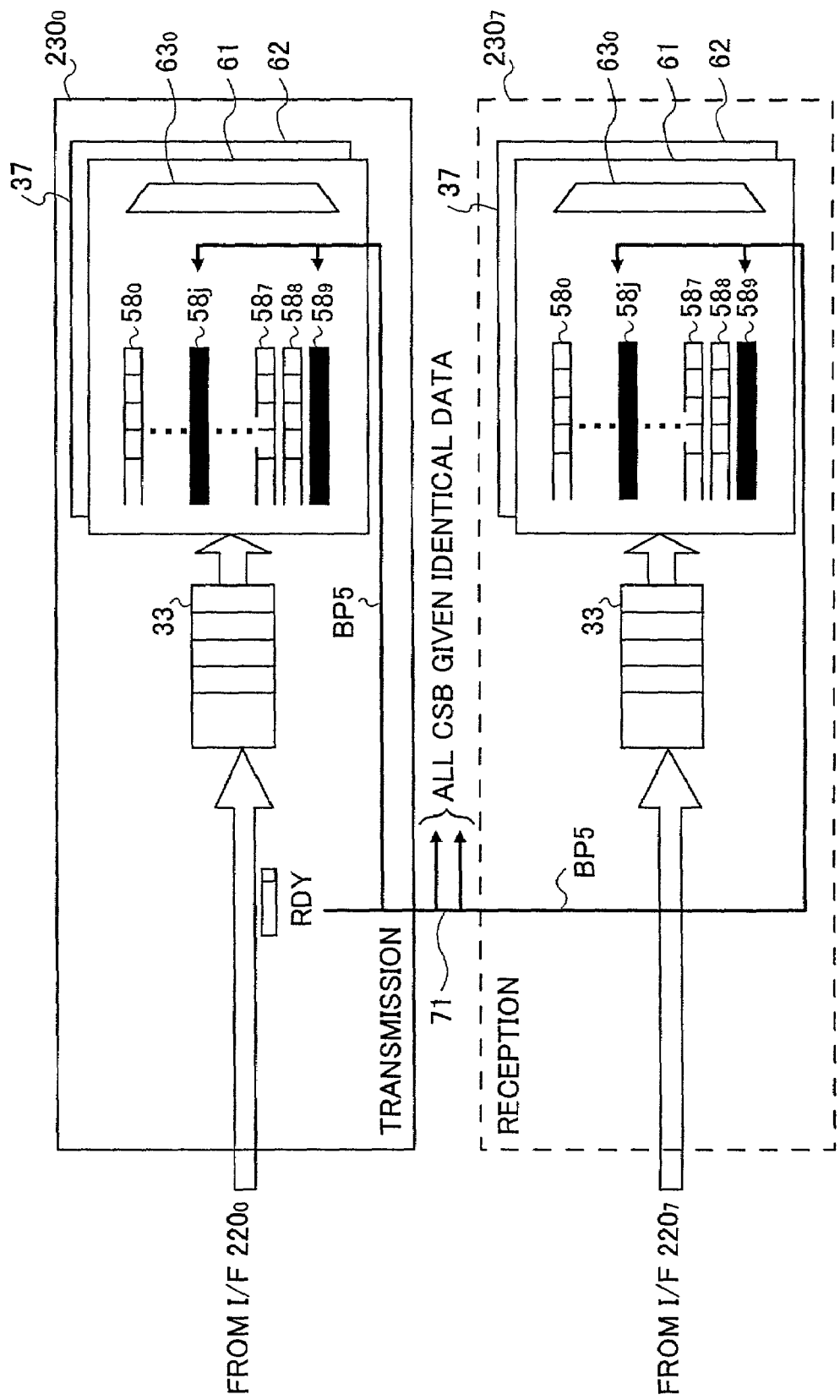
FIG. 10 is a diagram for explaining back pressure control using a back pressure control signal.

FIG. 10 is a diagram for explaining back pressure control using a back pressure control signal. FIG. 10 shows in schematic form the internal composition of the interface $230_0$ described with reference to FIG. 8 above. Additionally, FIG. 10 also shows the internal composition of the interface $230_7$.

As described above, the back pressure signal BP5 is a signal that is transmitted serially via the back pressure bus.

The back pressure bus is indicated in FIG. 10 by the reference number 71. The back pressure bus 71 connects the interfaces $230_0$-$230_7$ to each other.

The "RDY" shown in FIG. 10 means the back pressure signal BP2 transmitted from the interface $220_0$ by the flow control cell. This back pressure signal BP2 includes, in addition to the above-described port unit requests, link level back pressure requests as well. When the back pressure signal BP2 is a predetermined value, the back pressure signal BP2 requests a stop (link level back pressure), and moreover in class units, to all readouts from the buffers corresponding to the interfaces $230_0$-$230_7$. For example, in the situation shown in FIG. 10, a cell readout stop is requested for class j cells (j being class 0 through class 7) and multicast cells.

The third scheduler, having received the above-described type of back pressure signal BP2, controls the queue $58_j$ of the interface $230_0$ and the queue $58_9$ corresponding to the multicast, stopping cell readout from these buffers. More specifically, the selection logic of the selectors 66 and 67 shown in FIG. 9 is designed so as not to select the queue $58_j$ and $58_9$. At the same time, the third scheduler outputs the back pressure signal BP5 to the other interfaces $230_1$-$230_7$ via the back pressure bus 71. The back pressure signal BP5 includes data that specifies the queue $58_j$ and the queue $58_9$. FIG. 10 shows a state in which the back pressure signal BP5 calls a stop to cell readout from the interface $230_7$ and the queues $58_j$ and $58_9$.

By the above-described back-pressure control, the transmission of cells addressed to the interface $220_0$ from all the interfaces $230_0$-$230_7$ can be stopped.

A description will now be given of back pressure control using the back pressure signal BP3, with reference to FIG. 11 and FIG. 12.

Figure 11:
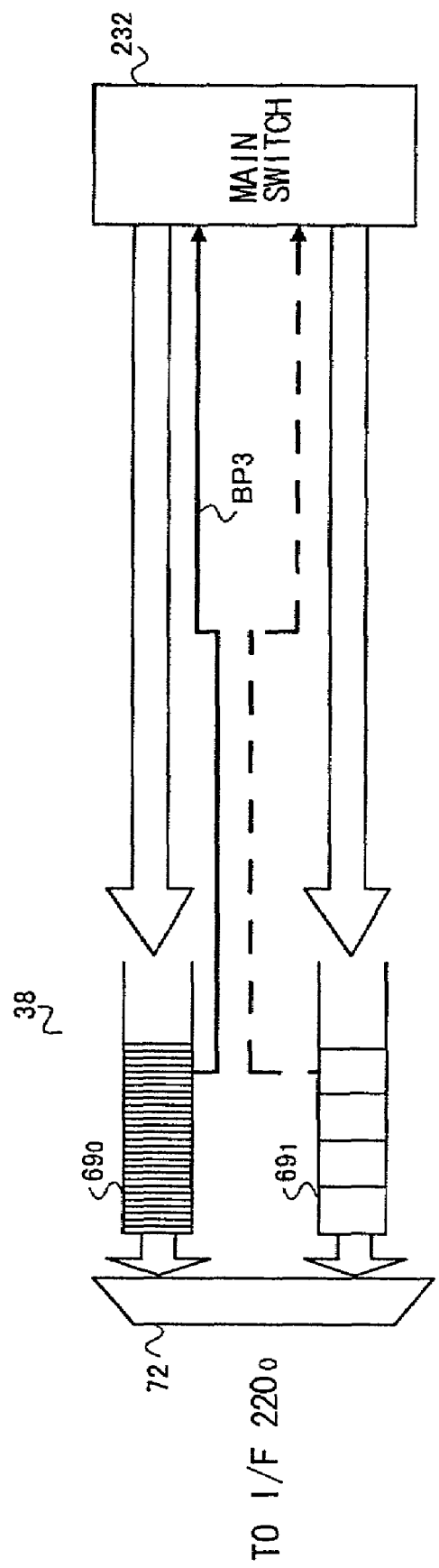
FIG. 11 is a schematic diagram of a common buffer and an input buffer of an interface.

FIG. 11 is a schematic diagram of a common buffer and an input buffer of an interface.

As described above, the back pressure signal BP3 is generated when either the input buffer 38 or the common buffer 34 inside the interface $230_0$ of the switch unit 23 assumes a predetermined state.

The composition shown in FIG. 11 comprises buffers $69_0$ and $69_1$ corresponding to outputs OUT0 and OUT1 and a selector 72. In the event that the use volume of the buffer $69_0$ or the buffer $69_1$ exceeds a predetermined threshold value, then the back pressure signal BP3 is output to the main switch 232. As described above, the back pressure signal BP3 is composed of flow cells. Cells stay in the buffer $69_0$ or the buffer $69_1$ only when flow control cells concentrate. Typically, the transmission rate from the buffers $69_0$ and $69_1$ is higher than the reception rate from the main switch 232. Thus, cells do not clog up the buffer $69_0$ and $69_1$, and as long as flow control cell traffic is not concentrated, the back pressure signal BP3 does not become enabled.

Figure 12:
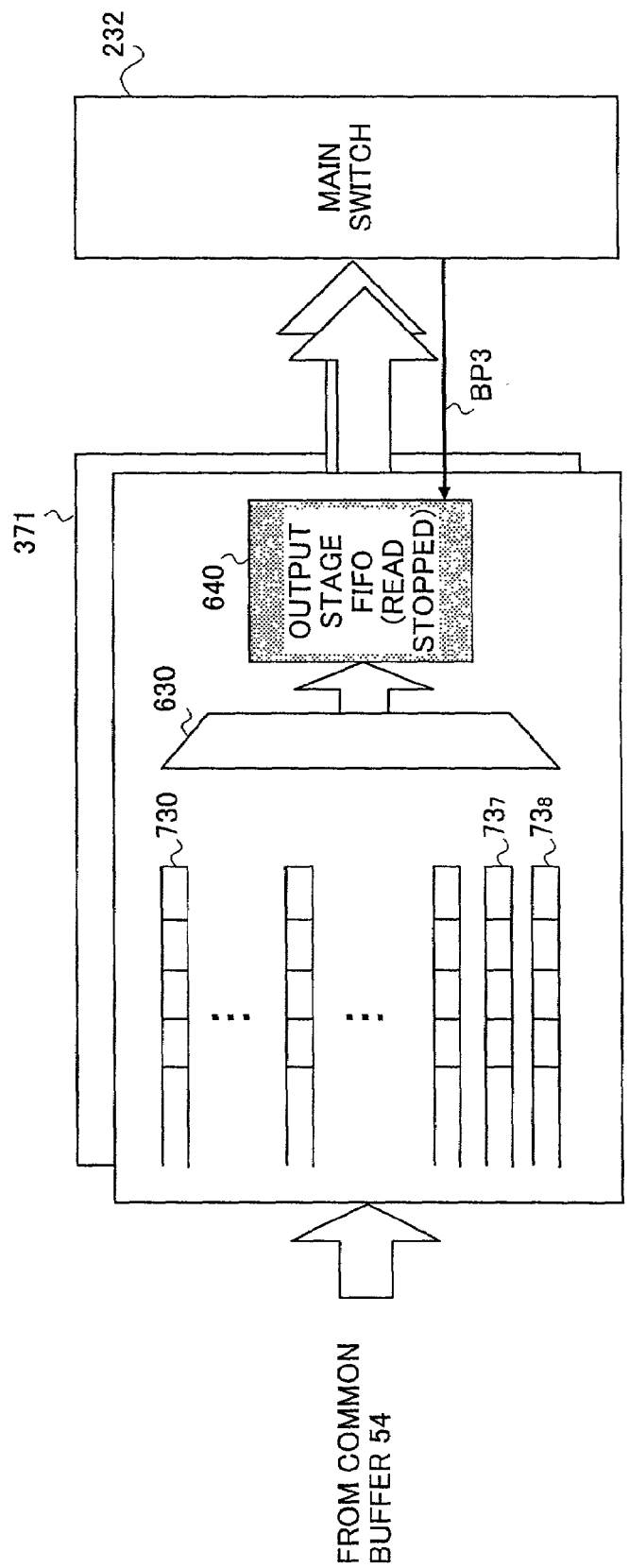
FIG. 12 is a diagram for explaining back pressure control using a back pressure control signal.

FIG. 12 is a diagram for explaining back pressure control using a back pressure control signal. As shown in FIG. 12, the main switch 232, having received the back pressure signal BP3, outputs to the buffer $64_0$ whose input (in the example shown in FIG. 12, input IN0) corresponds to a demultiplexer 371. As a result, cell readout from the buffer $64_0$ is stopped.

A description will now be given of the generation of the back pressure signal BP1, with reference to FIG. 13.

Figure 13:
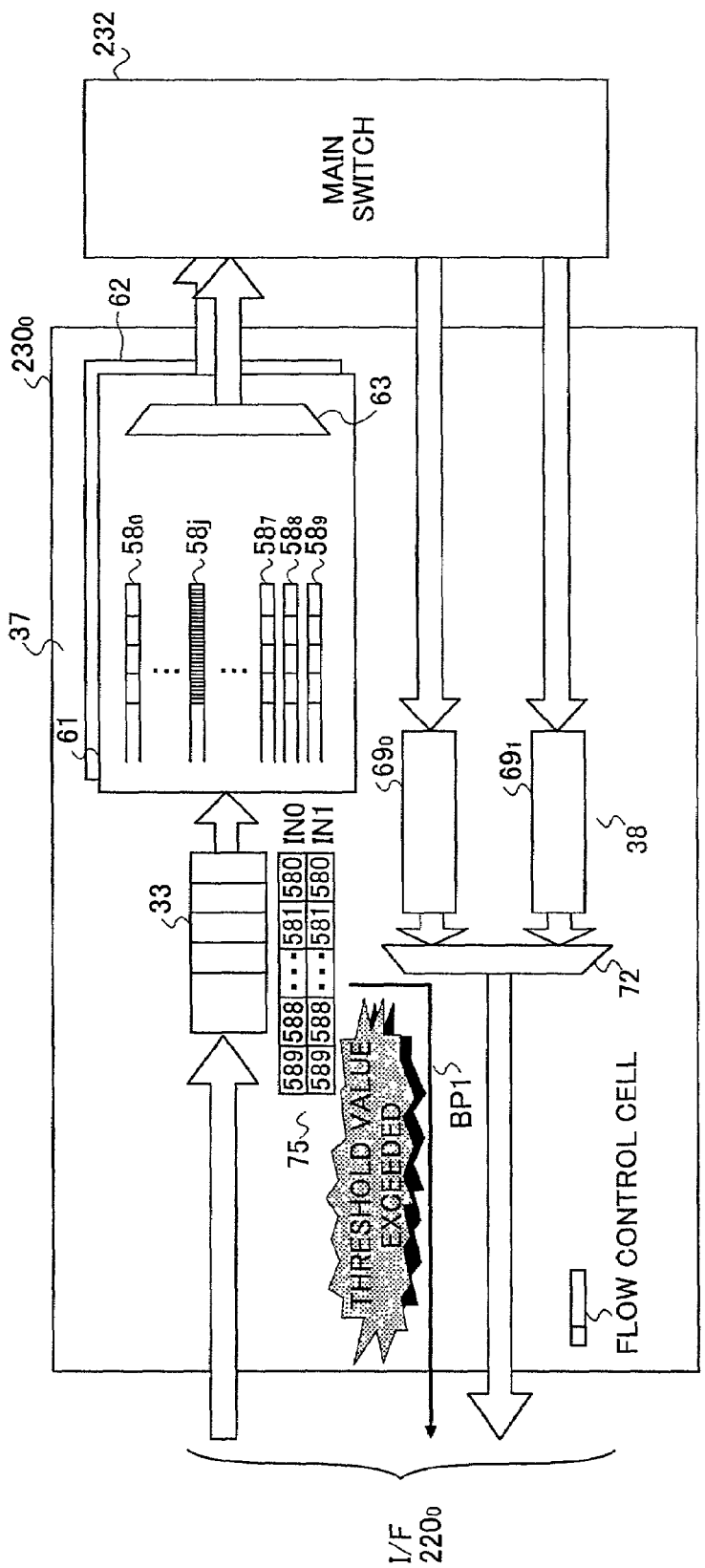
FIG. 13 is a diagram showing generation of a back pressure control signal.

FIG. 13 is a diagram showing generation of a back pressure control signal. In the example shown in FIG. 13, the back pressure signal being generated is BP1.

In the example shown in FIG. 13, a queue $58_j$ corresponds to a class j inside the buffer 61 that forms the output buffer 37 of the input IN0 in the interface $230_0$. When the queue $58_j$ is congested or there is a possibility that it will become congested, the back pressure signal BP1 is generated. As described above, the back pressure signal 1 is formed from flow control cells.

The interface $230_0$ is equipped with a cell counter 75. The cell counter 75 counts the cells of each class stored in the common buffer 33, the cells addressed to the main processor $227_8$ shown in FIG. 5 and the multicast cells, respectively. The reference numerals $58_0$-$58_9$ indicating the queues inside the cell counter 75 shown in FIG. 13 indicate the respective counters. The count values may be the total number of incoming cells or the number of cells coming in during a predetermined time period (cell flow volume). A threshold value is then established for the total number of incoming cells or the flow volume. A comparator provided inside the cell counter 75 compares the count with the predetermined threshold value. If the results of the comparison exceed the threshold or show an overflow, then flow control cells that form the back pressure signal 1 are sent to the output OUT1. These flow control cells include data that identifies the queue $58_j$ and data that distinguishes between unicast and multicast.

A description will now be given of the generation of the back pressure signal BP5, with reference to FIG. 14.

Figure 14:
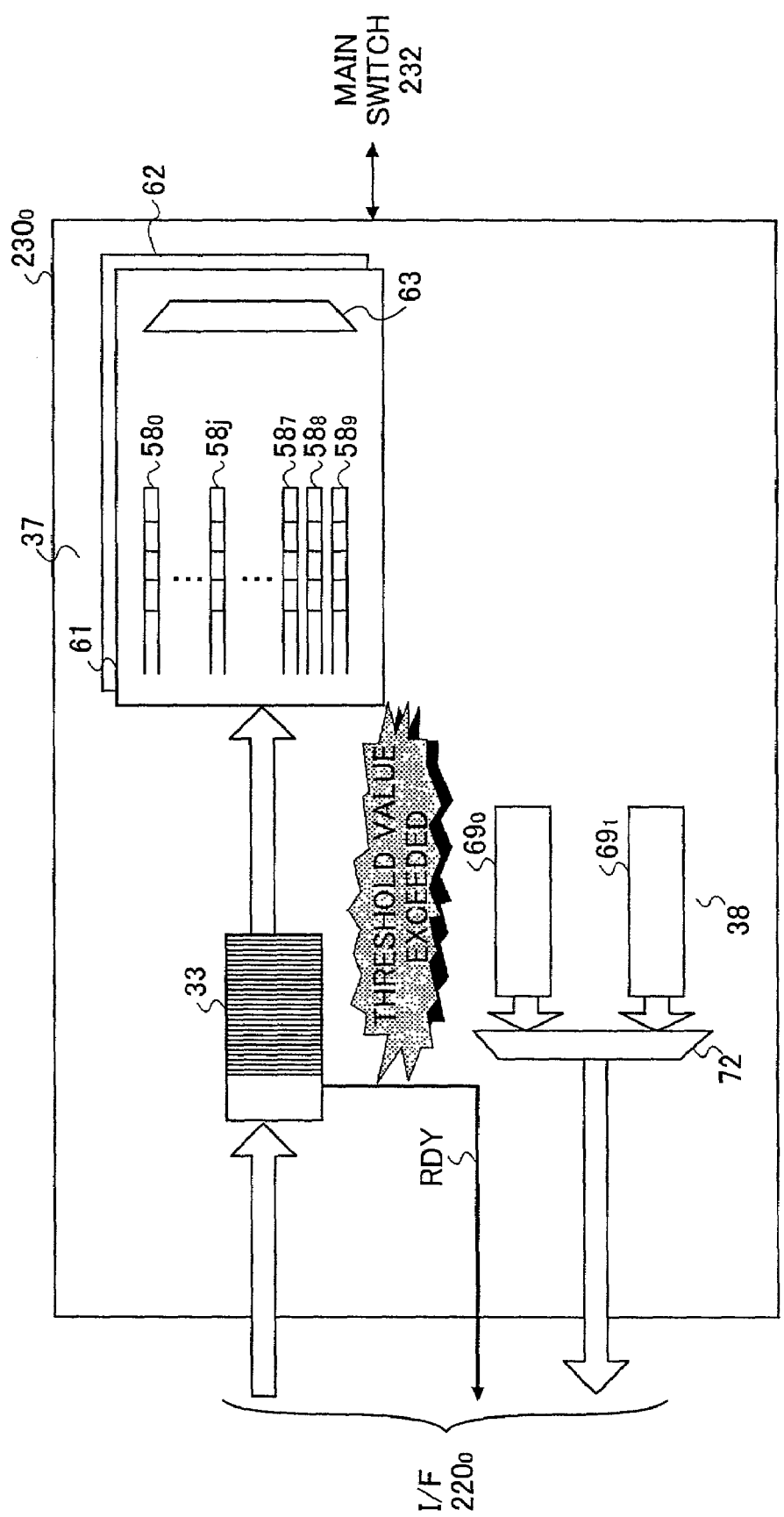
FIG. 14 is a diagram showing generation of another back pressure control signal.

FIG. 14 is a diagram showing generation of another back pressure control signal. In the example shown in FIG. 14, the back pressure signal being generated is BP5.

In the example shown in FIG. 14, when the flow of cells into the common buffer 33 of the input IN0 in the interface $230_0$ exceeds the threshold value or there is an overflow, the RDY signal described above that is the equivalent of the back pressure signal BP2 is transmitted to the interface $220_0$ by the flow control cells.

A description will now be given of other instances of back pressure control using the back pressure signal BP1, with reference to FIG. 15.

Figure 15:
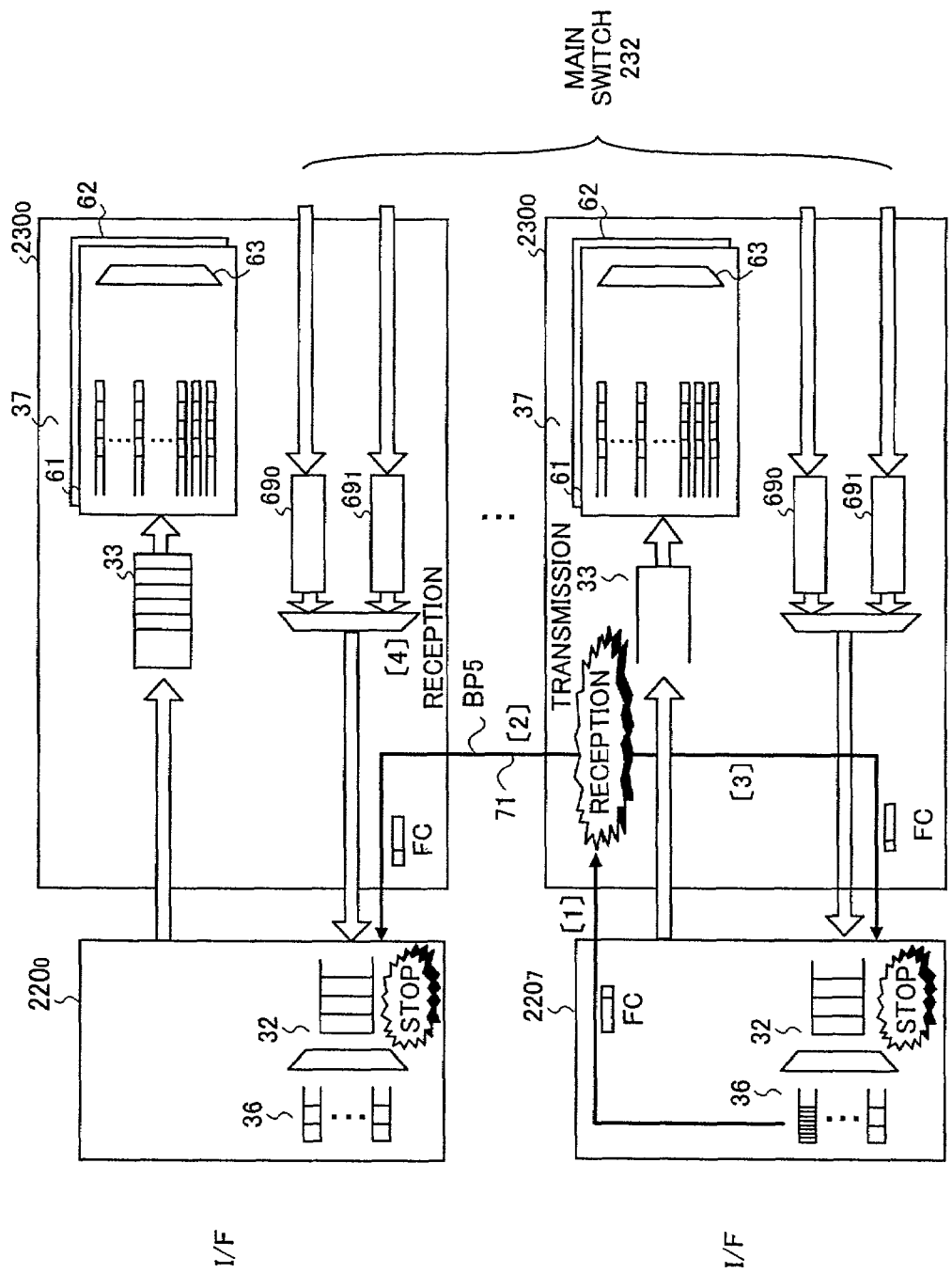
FIG. 15 is a diagram a case in which a cell number or flow within a queue corresponding to a class within an output buffer provided in an interface internal to a circuit processing unit of an L3 processor exceeds a predetermined threshold value.

FIG. 15 is a diagram a case in which a cell number or flow within a queue corresponding to a class within an output buffer provided in an interface internal to a circuit processing unit of an L3 processor exceeds a predetermined threshold value.

In the situation described above with reference to FIG. 10, back pressure control using the back pressure signal BP5 stops the transmission of cells addressed to the interface $220_0$ from all the interfaces $230_0$-$230_7$, that is, back pressure control is exercised at link level. By contrast, the back pressure control described below with reference to FIG. 15 is control exercised at by class unit.

FIG. 15 shows a case in which the number of cells or the flow volume of cells inside the queue corresponding to a class within the output buffer 36 provided in the interface $220_7$ inside the circuit processor $22_7$ of the L3 processor 22 exceeds the predetermined threshold value. In this case, the flow control cells FC that form the back pressure signal BP2 are transmitted from the interface $220_7$ to the corresponding interface $230_7$ (step [1] in FIG. 15). When the flow control cells FC are received, the interface $230_7$ outputs the back pressure signal BP5 having the same data as the flow control cell FC to the apparatus and to all the other interfaces $230_0$-$230_6$ via the back pressure bus 71 (step [2]). The interface $230_7$ transmits the received flow control cell FC to the interface $220_7$ (step [3]). The interfaces $230_0$-$230_6$ that have received the back pressure signal BP5 in step [2] then transmit the corresponding FC packets to the interfaces $220_0$-$220_6$ in step [4].

A description will now be given of measures to prevent degradation of fragmenting efficiency attendant upon making the cells a fixed length.

The process of fragmenting, that is, turning variable-length packets into cells of fixed length, involves a process of padding that data which does not satisfy the number of cells needed to form a payload portion of a fixed-length cell. This padding, however, reduces actual throughput and produces wasted bandwidths. In order to prevent such bandwidth degradation, it is preferable that the main switch 232 be configured so as to be able to accommodate variable length cells as well. In response to an accumulation of cells in the output buffer in which cells bound for the same output port of the main switch 232 are saved, a plurality of individual cells are combined and sent together to the main switch 232 (multi-access method: Multi Adjoining Combined Cell).

Assuming each input port physical bandwidth is Bwp, cell transfer time is m, and interval between cells is n, the effective bandwidth Bwa=Bwp×m/(m+n). In the case of triple access multi-access where n=3, Bwa=Bwp×3 m/(3m+n), making improvement in efficiency possible.

A description will now be given of the advantages of the communications apparatus according to a first embodiment of the present invention.

First, the fixed-length cells obtained from conversion of the variable length cells are switched, so differences in speed among various different interfaces can be effectively absorbed and jitter due to switching can be reduced. Thus, QoS control and back pressure control can be effectively and efficiently performed for a variety of interfaces such as ATM, ethernet and so forth.

Second, the back pressure signal BP2 from the output side of the L3 processor 22 interfaces $220_0$-$220_7$ to the input side of the interfaces $230_0$-$230_7$ of the switch unit 23 has been configured so as to bypass the main switch 232, so the back pressure latency can be reduced, the buffer can be utilized efficiently and the main switch input-output port bandwidth can be used efficiently.

Third, when the switch unit 23 interfaces $230_0$-$230_7$ are congested or are predicted to be congested, cells are not discarded by the common buffer 32 on the output side of the interfaces $220_0$-$220_7$ but instead cells are discarded on the input side of the common buffer 33, so any service reduction during periods of congestion can be localized.

Fourth, by providing link level second stage back pressure control using the back pressure bus 71 and the flow level using flow control cells, back pressure control can be carried out efficiently and effectively.

A description will now be given of a communications apparatus according to a second embodiment of the present invention, with reference to FIG. 16 and FIG. 17.

The communications apparatus according to a second embodiment of the present invention solves the previously described drawback of the conventional art, that is, the inability of the conventional art to accommodate different networks efficiently and relay data efficiently, and in particular the second drawback of the conventional art, that is, overall router buffer utilization efficiency is low.

Figure 16A:
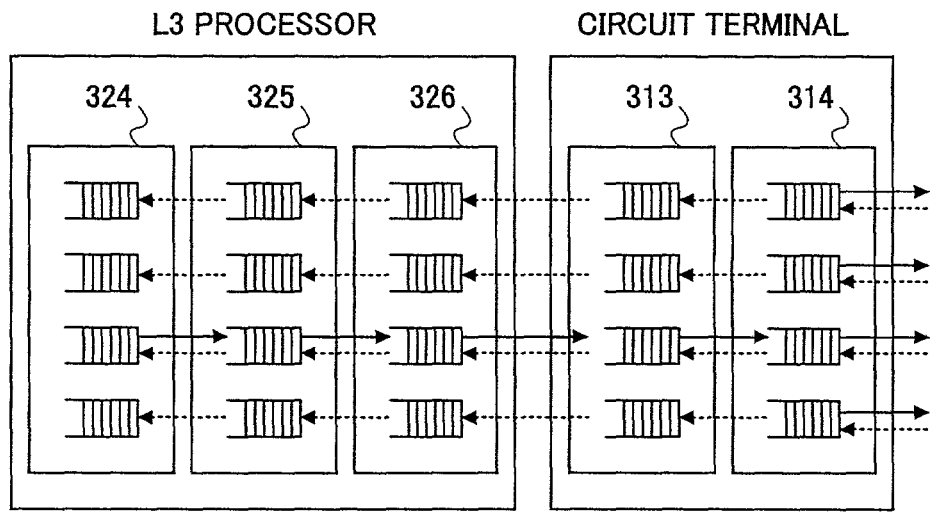
FIG. 16A illustrates a configuration having a plurality of buffers and FIG. 16B illustrates an occurrence of blocking.
Figure 16B:
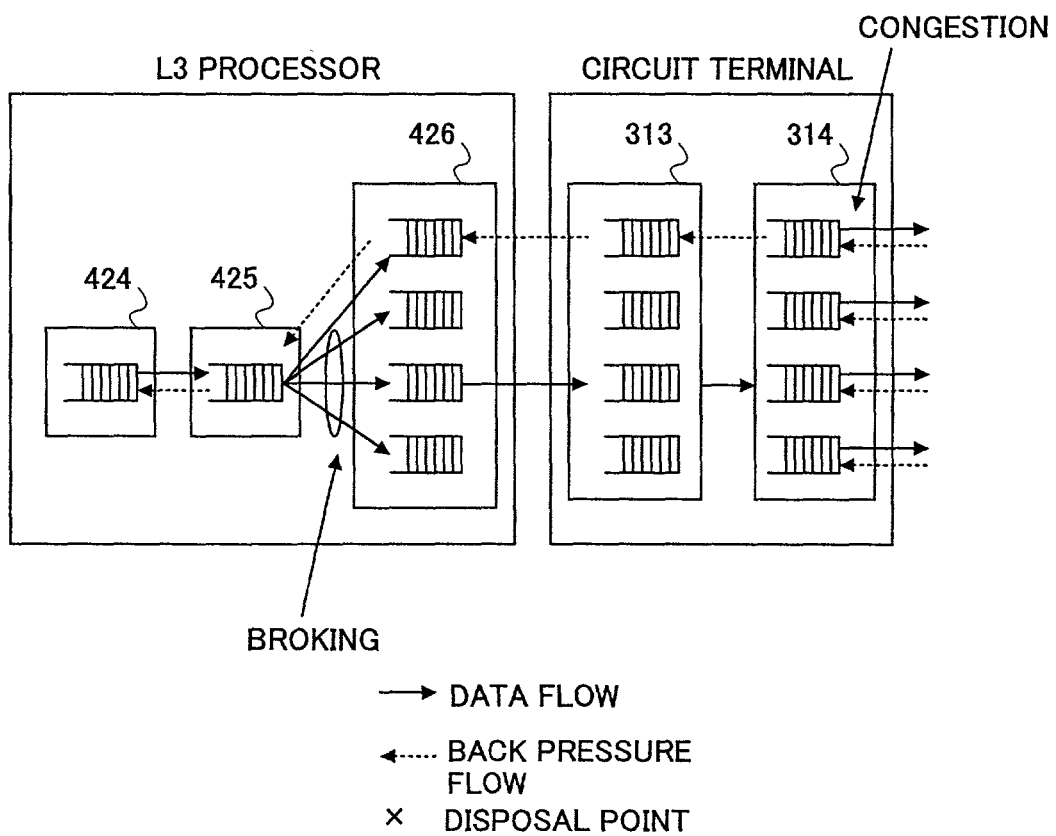
Figure 17A:
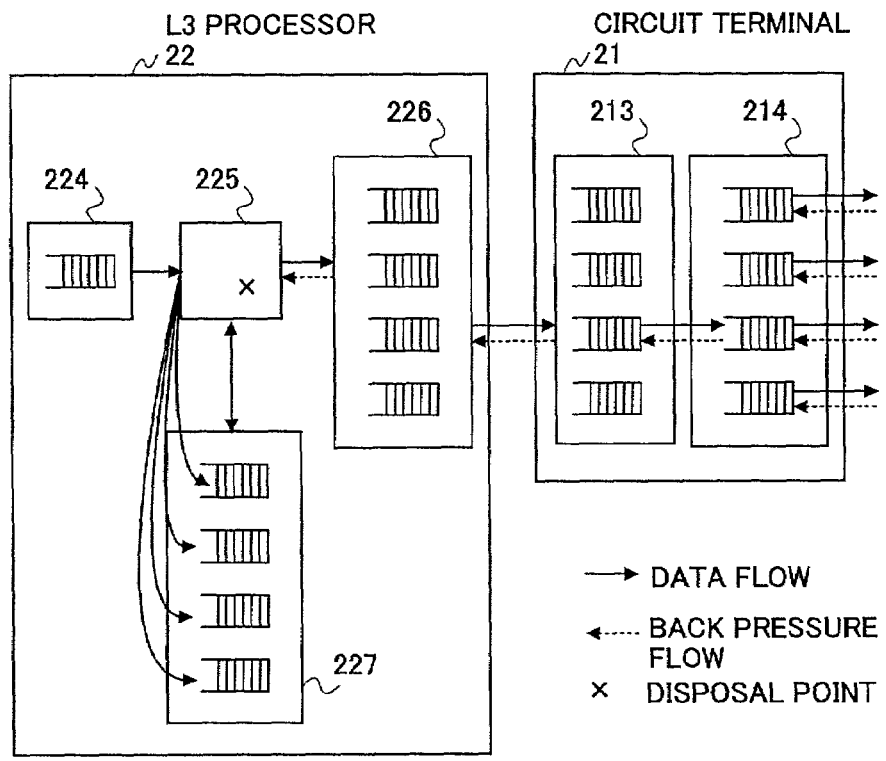
Figure 17B:
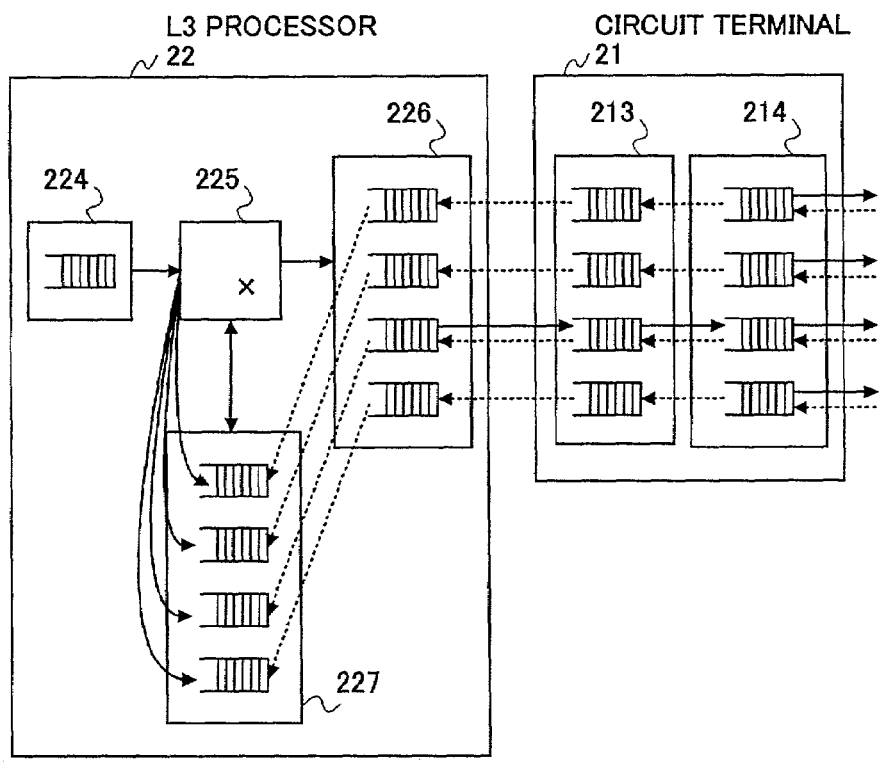

FIG. 16A illustrates a configuration having a plurality of buffers and FIG. 16B illustrates an occurrence of blocking. FIGS. 17A and 17B are diagrams showing a communications apparatus according to a second embodiment of the present invention, in which FIG. 17A illustrates a physical back pressure flow and FIG. 17B illustrates a logical back pressure flow.

FIGS. 16A and 16B show a conventional L3 processor and circuit terminal. The L3 processor comprises switch interface 324, local switch 325 and circuit interface 326. The circuit terminal comprises L3 interface 313 and physical layer processor 314. The L3 processor is equipped with a buffer for every output circuit unit, and performs back pressure control at every output circuit unit. Since back pressure control is performed in output circuit units, then, as described above, the router buffers as a whole cannot be utilized efficiently.

FIG. 16B shows another conventional example, in which the L3 processor comprises a switch interface 424, a local switch 425 and a wire interface. The local switch 425 is composed of a common buffer. The common buffer 425 aggregates the output circuit (port). As described above, when a request is received for back pressure control of an output circuit, the buffer continues to be influenced by back pressure until such time as it receives data indicating that the output circuit is no congested, leading to the occurrence of a blocking state in which data cannot be output.

FIGS. 17A and 17B show a composition that solves the above-described problem. As stated above, FIG. 17A illustrates a physical back pressure flow and FIG. 17B illustrates a logical back pressure flow. The local switch 225 terminates the back pressure signal and discards cells at each output circuit. Accordingly, an occurrence of blocking like that shown in FIG. 16(b) can be avoided.

A description will now be given of a communications apparatus according to a third embodiment of the present invention, with reference to FIG. 18.

Figure 18:
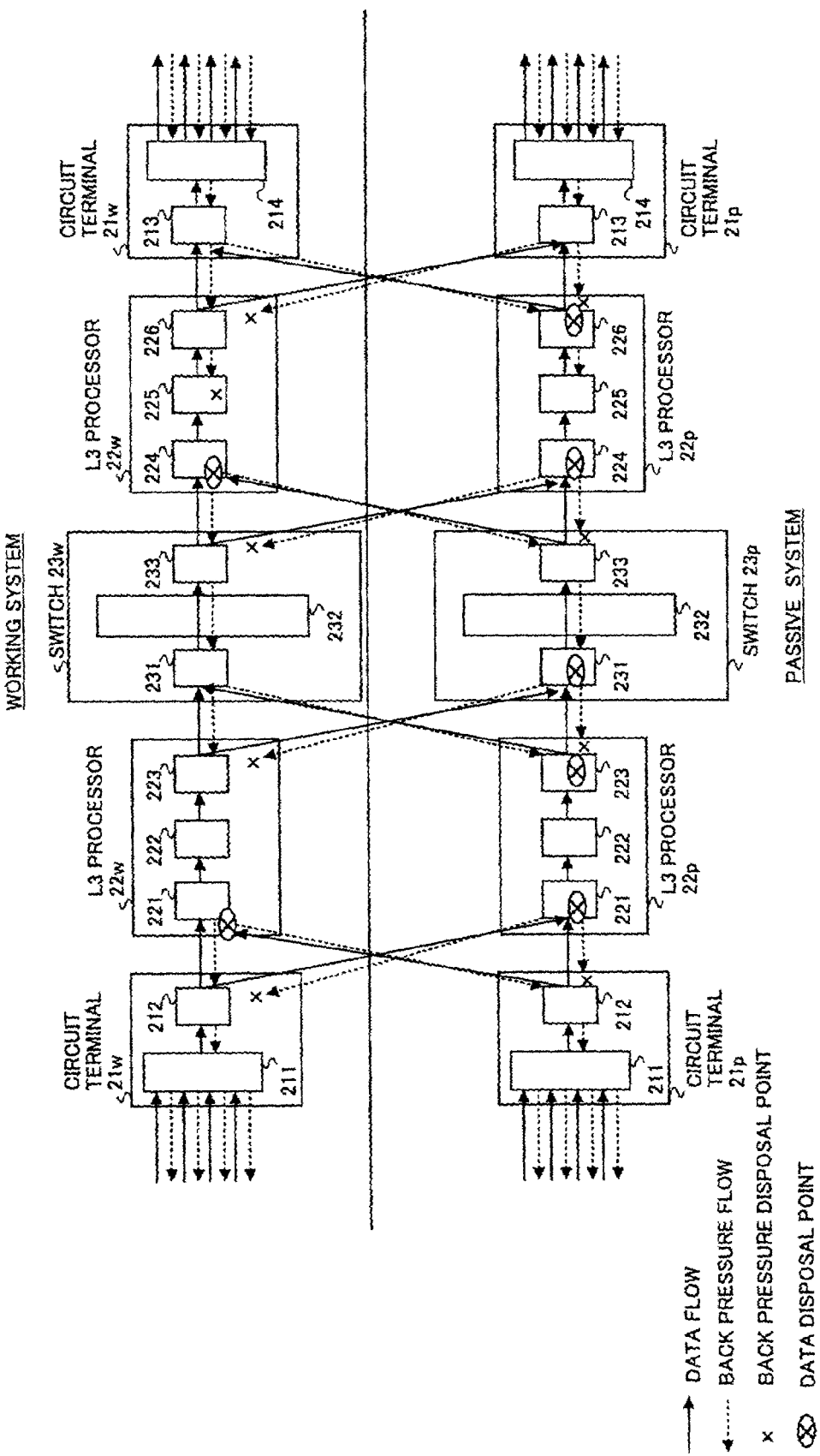
FIG. 18 is a diagram showing a communications apparatus according to a third embodiment of the present invention.

FIG. 18 is a diagram showing a communications apparatus according to a third embodiment of the present invention.

The communications apparatus according to a third embodiment of the present invention solves the previously described drawback of the conventional art, that is, the inability of the conventional art to accommodate different networks efficiently and relay data efficiently, and in particular the third drawback of the conventional art, that is, that a failure in the working system or the passive system may, depending on the back pressure controlled state and the buffering state, cause a doubling up or a skipping of data to occur.

In a multiplexed configuration, it is desirable to distinguish between back pressure of the working system and back pressure of the passive system. The working system, which receives requests for back pressure control from the passive system, discards such requests without stopping the transmission of cells. The determination as to working system or passive system may be made by reference to a signal indicating an apparatus state. That is, a flag indicating working system/passive system may be provided within the back pressure signal BP1.

As shown in FIG. 18, a back pressure signal from the working system is discarded by the passive system. By contrast, a back pressure signal from the working system to the passive system is not discarded by the passive system by is received by every point.

A description will now be given of a communications apparatus according to a fourth embodiment of the present invention, with reference to FIG. 19.

FIG. 19 is a diagram showing a communications apparatus according to a fourth embodiment of the present invention.

The communications apparatus according to a third embodiment of the present invention solves the previously described drawback of the conventional art, that is, the inability of the conventional art to accommodate different networks efficiently and relay data efficiently, and in particular the third drawback of the conventional art, that is, whenever back pressure control must be performed frequently it is impossible to satisfy data jitter and delay standards.

As shown in FIG. 19, the circuit terminal 21 described previously comprises a buffer capacity monitor 215. The buffer capacity monitor 215 monitors the capacity of the internal buffer corresponding to the circuits inside the physical layer processor 214 and transmits the results of that monitoring process directly to the local switch 227. Additionally, the circuit interface 226 and the L3 interface 213 are bufferless. As a result, cells are not subject to buffering between the local switch 225 and the physical layer processor 214, so buffering does not take place even in the event that back pressure control is requested. Moreover, buffering is not performed on cells even after the back pressure control is released, so data is not transmitted to the output circuits in a burst.

As a result of the above-described measures, cell jitter and delay can be held to a minimum.

The above description is provided in order to enable any person skilled in the art to make and use the invention and sets forth the best mode contemplated by the inventors of carrying out the invention.

The present invention is not limited to the specifically disclosed embodiments, and variations and modifications may be made without departing from the scope and spirit of the present invention.

The present application is based on Japanese Priority Application No. 2001-196778, filed on Jun. 28, 2001, the entire contents of which are hereby incorporated by reference.

What is claimed is:

1. A communications apparatus for switching among different interfaces and comprising a switch unit, the switch unit comprising:
   a main switch for switching data of a fixed length; and
   an interface having a first buffer for an input of the main switch and a second buffer for an output of the main switch,
   wherein the communications apparatus further comprises a processor that is connected to the switch unit and processes data according to a predetermined protocol, the processor having a third buffer that is connected to the first buffer and having a fourth buffer connected to the second buffer, the processor performing back pressure control on the third buffer by receiving a flow control signal that is sent from the second buffer when the first buffer assumes a predetermined state.

2. The communications apparatus as claimed in claim 1, wherein the processor further performs back pressure control on the first buffer when the second buffer assumes a predetermined state.

3. The communications apparatus as claimed in claim 2, wherein the back pressure control request is formed by a predetermined flow control cell.

4. The communications apparatus as claimed in claim 2, wherein the back pressure control is performed by predetermined Quality of Service (QoS) class units.

5. The communications apparatus as claimed in claim 2, wherein back pressure control is performed in circuit units.

6. The communications apparatus as claimed in claim 2, wherein the predetermined state is determined at predetermined QoS class units.

7. The communications apparatus as claimed in claim 2, wherein the predetermined state is determined at circuit units.

8. The communications apparatus as claimed in claim 1, wherein the back pressure control request is formed by a predetermined flow control cell.

9. The communications apparatus as claimed in claim 1, wherein the back pressure control is performed by predetermined Quality of Service (QoS) class units.

10. The communications apparatus as claimed in claim 1, wherein back pressure control is performed in circuit units.

11. The communications apparatus as claimed in claim 1, wherein the predetermined state is determined at predetermined QoS class units.

12. The communications apparatus as claimed in claim 1, wherein the predetermined state is determined at circuit units.

13. The communications apparatus as claimed in claim 1, wherein the processor has a local switch that supplies data received from the switch unit to an internal buffer corresponding to the appropriate circuit.

14. The communications apparatus as claimed in claim 1, wherein:
   the processor has a local switch equipped with a buffer that temporarily stores data received from the switch unit; and
   the local switch itself has another local switch that reads the data from the buffer and supplies the data so read to an internal buffer of the appropriate circuit.

15. A communications apparatus for switching among different interfaces and comprising a switch unit, the switch unit comprising:
   a main switch for switching data of a fixed length; and
   an interface having a first buffer for an input of the main switch and a second buffer for an output of the main switch,
   wherein the communications apparatus further comprises a processor that is connected to the switch unit and processes data according to a predetermined protocol, the processor having a third buffer and a fourth buffer connected to the first buffer and the second buffer, the processor performing back pressure control on the first buffer when the fourth buffer assumes a predetermined state.

16. The communications apparatus as claimed in claim 15, wherein the back pressure control request is formed by a predetermined flow control cell.

17. The communications apparatus as claimed in claim 15, wherein the back pressure control is performed by predetermined Quality of Service (QoS) class units.

18. The communications apparatus as claimed in claim 15, wherein back pressure control is performed in circuit units.

19. The communications apparatus as claimed in claim 15, wherein the predetermined state is determined at predetermined QoS class units.

20. The communications apparatus as claimed in claim 15, wherein the predetermined state is determined at circuit units.

21. A communications apparatus for switching among different interfaces and comprising a switch unit, the switch unit comprising:
   a main switch for switching data of a fixed length; and
   an interface having a first buffer for an input of the main switch and a second buffer for an output of the main switch,
   wherein the communications apparatus further comprises a processor that is connected to the switch unit and processes data according to a predetermined protocol, the processor having a third buffer that is connected to the first buffer and having a fourth buffer connected to the second buffer, the processor performing back pressure control on the fourth buffer when receiving a request for back pressure control from an apparatus that is connected to the processor, and the processor further performing back pressure control on the first buffer when the fourth buffer assumes a predetermined state.

22. The communications apparatus as claimed in claim 21, wherein the back pressure control is performed by predetermined Quality of Service (QoS) class units.

23. The communications apparatus as claimed in claim 22, wherein a terminal unit is provided between the processor and the circuits, the terminal unit comprising:

a buffer provided at each circuit; and a buffer capacity monitor that monitors a capacity of the buffer and controls the buffer so as to temporarily store data received from the switch unit.

24. The communications apparatus as claimed in claim 21, wherein back pressure control is performed in circuit units.

25. A communications control method for switching among different interfaces, the communications control method being performed by a communications apparatus that includes a switch unit and a processor connected to the switch unit processing data according to a predetermined protocol, the method comprising the steps of:

the switch unit switching data of a fixed length after once buffering the data into a first buffer; and the switch unit outputting the switched data after once buffering the switched data into a second buffer; wherein the processor includes a third buffer connected to the first buffer and a fourth buffer connected to the second buffer, and the processor performs back pressure control on the first buffer when the fourth buffer assumes a predetermined state.

* * * * *